(12) United States Patent
Sato et al.

(10) Patent No.: US 10,726,993 B2
(45) Date of Patent: Jul. 28, 2020

(54) MULTILAYER CERAMIC CAPACITOR

(71) Applicant: TAIYO YUDEN CO., LTD., Chuo-ku, Tokyo (JP)

(72) Inventors: So Sato, Takasaki (JP); Yoshiaki Iijima, Takasaki (JP); Takashi Sasaki, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 15/782,592

(22) Filed: Oct. 12, 2017

(65) Prior Publication Data

US 2018/0108479 A1    Apr. 19, 2018

(30) Foreign Application Priority Data

Oct. 17, 2016   (JP) .................................. 2016-203369

(51) Int. Cl.
| | |
|---|---|
| *H01G 4/005* | (2006.01) |
| *H01G 4/12* | (2006.01) |
| *H01G 4/30* | (2006.01) |
| *H01G 4/228* | (2006.01) |
| *H01G 4/232* | (2006.01) |
| *H01G 2/06* | (2006.01) |

(52) U.S. Cl.
CPC ................. *H01G 4/12* (2013.01); *H01G 2/06* (2013.01); *H01G 4/005* (2013.01); *H01G 4/228* (2013.01); *H01G 4/232* (2013.01); *H01G 4/30* (2013.01)

(58) Field of Classification Search
CPC .......... H01G 4/005; H01G 4/30; H01G 4/228; H01G 4/232; H01G 4/12; H01G 4/2325

USPC ......... 361/301.4, 306.1, 306.3, 321.1, 321.2, 361/321.3
See application file for complete search history.

(56) References Cited

U.S. PATENT DOCUMENTS

| | | | | |
|---|---|---|---|---|
| 8,174,816 B2* | 5/2012 | Seo | .......................... | H01G 4/30 361/301.4 |
| 8,576,538 B2* | 11/2013 | Kuroda | .................. | H01G 4/012 361/301.4 |
| 8,885,319 B2* | 11/2014 | Bultitude | ............... | H01G 4/005 361/303 |
| 2004/0240146 A1* | 12/2004 | Kayatani | ................ | H01G 2/103 361/306.3 |

(Continued)

FOREIGN PATENT DOCUMENTS

JP        2015037178 A        2/2015

*Primary Examiner* — Arun Ramaswamy
(74) *Attorney, Agent, or Firm* — Law Office of Katsuhiro Arai

(57) ABSTRACT

In an embodiment, a multilayer ceramic capacitor 10 includes: a first external electrode 12 having a first part 12a provided on one height-direction face, and a second part 12b provided on the other height-direction face, of the capacitor body 11; and a second external electrode 13 having a first part 13a provided on one height-direction face, and a second part 13b provided on the other height-direction face, of the capacitor body 11. In addition, the reference length L1a of the first part 12a, and the reference length L1b of the second part 12b, of the first external electrode 12 satisfy the relational expression "L1a>L1b," while the reference length L2a of the first part 13a, and the reference length L2b of the second part 13b, of the second external electrode 13 satisfy the relational expression "L2a<L2b."

11 Claims, 9 Drawing Sheets

(56) References Cited

U.S. PATENT DOCUMENTS

| | | | |
|---|---|---|---|
| 2012/0300361 A1* | 11/2012 | Togashi | H01G 4/30 361/301.4 |
| 2013/0050898 A1* | 2/2013 | Seo | H01G 4/30 361/321.2 |
| 2014/0262463 A1* | 9/2014 | Lee | H05K 1/183 174/260 |
| 2015/0043124 A1* | 2/2015 | Kim | H01G 4/005 361/301.4 |

* cited by examiner

| | L1b&L2a | L1a&L2b | (L1a&L2b)/(L1b&L2a) | Strength test result |
|---|---|---|---|---|
| P1 | 250μm | 250μm | 1.00 | ----- |
| P2 | 250μm | 260μm | 1.04 | 5/100 |
| P3 | 250μm | 270μm | 1.08 | 2/100 |
| P4 | 250μm | 280μm | 1.12 | 0/100 |
| P5 | 250μm | 290μm | 1.16 | 0/100 |
| P6 | 250μm | 310μm | 1.24 | 0/100 |
| P7 | 250μm | 330μm | 1.32 | 0/100 |
| P8 | 250μm | 350μm | 1.40 | 0/100 |
| P9 | 250μm | 370μm | 1.48 | 0/100 |
| P10 | 250μm | 390μm | 1.56 | 0/100 |
| P11 | 250μm | 410μm | 1.64 | 0/100 |
| P12 | 250μm | 430μm | 1.72 | 0/100 |
| P13 | 250μm | 450μm | 1.80 | 0/100 |
| P14 | 250μm | 470μm | 1.88 | 0/100 |
| P15 | 250μm | 490μm | 1.96 | 0/100 |
| P16 | 250μm | 510μm | 2.04 | 0/100 |
| P17 | 250μm | 530μm | 2.12 | 0/100 |
| P18 | 250μm | 550μm | 2.20 | 0/100 |
| P19 | 250μm | 570μm | 2.28 | 0/100 |
| P20 | 250μm | 590μm | 2.36 | 0/100 |
| P21 | 250μm | 610μm | 2.44 | 0/100 |
| P22 | 250μm | 630μm | 2.52 | 0/100 |
| P23 | 250μm | 650μm | 2.60 | 0/100 |
| P24 | 250μm | 670μm | 2.68 | 0/100 |
| P25 | 250μm | 690μm | 2.76 | 0/100 |
| P26 | 250μm | 710μm | 2.84 | 0/100 |
| P27 | 250μm | 730μm | 2.92 | 0/100 |

[FIG. 15]
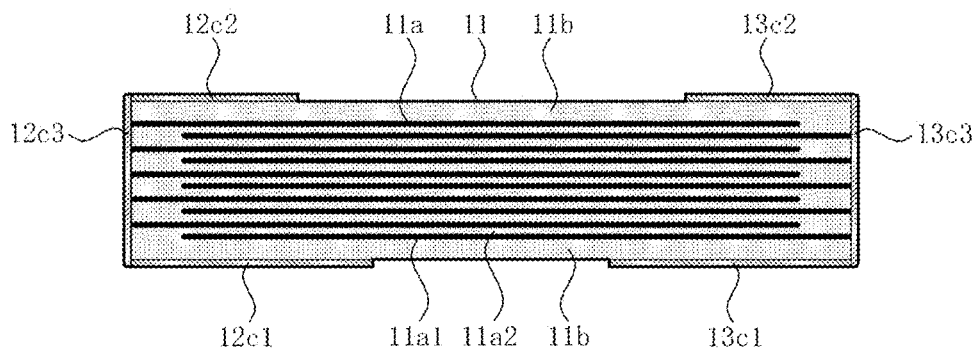
[FIG. 16]
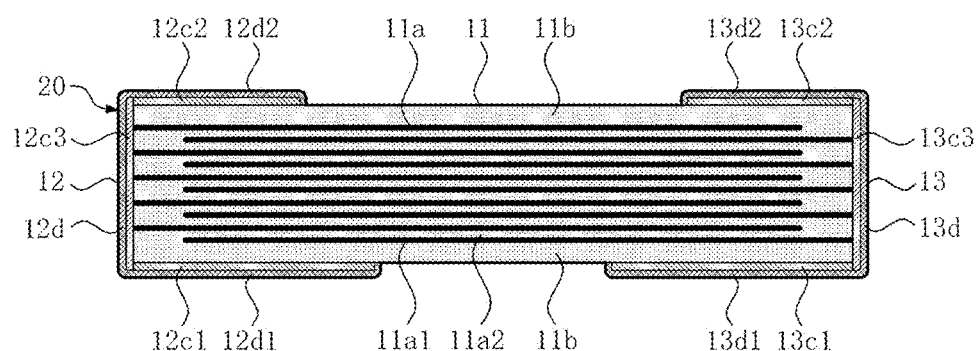
[FIG. 17]
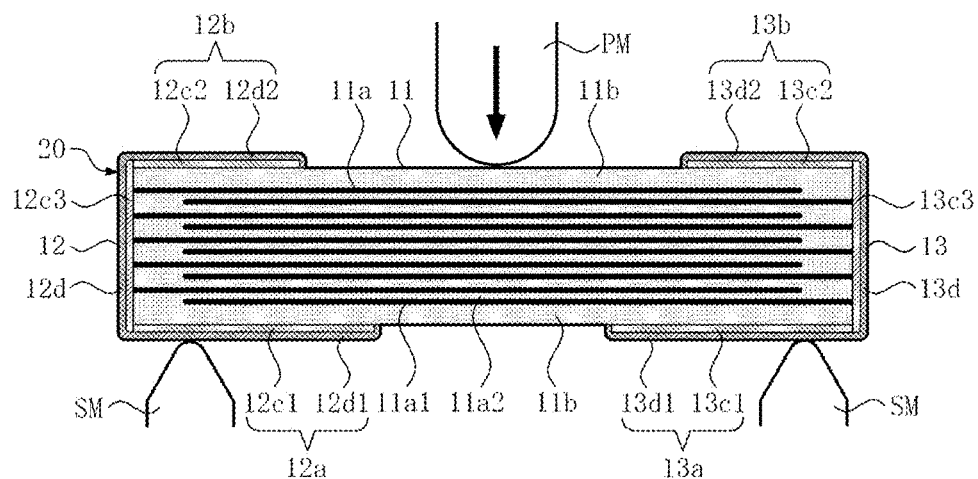

[FIG. 18]

| | L1b&L2b | L1a&L2a | (L1a&L2a)/(L1b&L2b) | Strength test result |
|---|---|---|---|---|
| P1 | 250 μm | 250 μm | 1.00 | ---------- |
| P28 | 250 μm | 260 μm | 1.04 | 6/100 |
| P29 | 250 μm | 270 μm | 1.08 | 3/100 |
| P30 | 250 μm | 280 μm | 1.12 | 0/100 |
| P31 | 250 μm | 290 μm | 1.16 | 0/100 |
| P32 | 250 μm | 310 μm | 1.24 | 0/100 |
| P33 | 250 μm | 330 μm | 1.32 | 0/100 |
| P34 | 250 μm | 350 μm | 1.40 | 0/100 |
| P35 | 250 μm | 370 μm | 1.48 | 0/100 |
| P36 | 250 μm | 390 μm | 1.56 | 0/100 |
| P37 | 250 μm | 410 μm | 1.64 | 0/100 |
| P38 | 250 μm | 430 μm | 1.72 | 0/100 |
| P39 | 250 μm | 450 μm | 1.80 | 0/100 |
| P40 | 250 μm | 470 μm | 1.88 | 0/100 |
| P41 | 250 μm | 490 μm | 1.96 | 0/100 |

MULTILAYER CERAMIC CAPACITOR

BACKGROUND

Field of the Invention

The present invention relates to a multilayer ceramic capacitor.

Description of the Related Art

In general, a multilayer ceramic capacitor comprises: a capacitor body of roughly rectangular solid shape which has a capacitive part constituted by multiple internal electrode layers stacked together with dielectric layers in between; a first external electrode which is provided on one length-direction face of the capacitor body and which is connected to some of the multiple internal electrode layers; and a second external electrode which is provided on the other length-direction face of the capacitor body and which is connected to the remainder of the multiple internal electrode layers. In general, the first external electrode and second external electrode each have a first part provided on one height-direction face of the capacitor body, a second part provided on the other height-direction face of the capacitor body, a third part provided on one width-direction face of the capacitor body, and a fourth part provided on the other width-direction face of the capacitor body.

Multilayer ceramic capacitors continue to face the need for size reduction in addition to the need for capacitance increase. In recent years, attempts have been made to address these needs by adopting ingenious shapes for external electrodes (refer to Patent Literature 1 mentioned later). These attempts are explained below.

When each external electrode has the first through fourth parts, as is the case of the aforementioned multilayer ceramic capacitor, the first part and second part that are present on both height-direction faces of the capacitor body are used for wiring the multilayer ceramic capacitor placed on the surface of, or embedded in, a circuit board. On the other hand, the third part and fourth part that are present on both width-direction faces of the capacitor body may be eliminated, because the aforementioned wiring can be achieved without these parts.

In other words, by shaping each external electrode as one having no third part or fourth part (having only the first part and the second part), and by increasing the width of the capacitor body and that of each internal electrode layer by the thickness of the third part and that of the fourth part, the capacitance can be increased without changing the width of the multilayer ceramic capacitor and the height of the multilayer ceramic capacitor can also be decreased without changing the capacitance.

In addition, another need in recent years has been to decrease the heights of circuit boards to which multilayer ceramic capacitors and other electronic components have been connected, in order to reduce the sizes of various electronic devices. To address this need on the multilayer ceramic capacitor end, the height of the multilayer ceramic capacitor, or specifically the height of the capacitor body, must be decreased.

However, decreasing the height of the capacitor body results in lower strength of the capacitor body. This means that, when the multilayer ceramic capacitor is placed on the surface of, or embedded in, a circuit board using a mounter, or after the multilayer ceramic capacitor is connected to a circuit board, the external force applied to the multilayer ceramic capacitor by the mounter, or the external force applied to the multilayer ceramic capacitor from the circuit board to which it is connected, makes the capacitor body susceptible to cracking.

Particularly when each external electrode is shaped as one having no third part or fourth part (having only the first part and the second part) in order to address the aforementioned need for multilayer ceramic capacitors, the supplementary strength from the third part and fourth part is no longer there, so decreasing the height of the capacitor body makes it more susceptible to cracking.

In other words, when each external electrode is shaped as one having no third part or fourth part (having only the first part and the second part) in order to address the aforementioned need for multilayer ceramic capacitors, while the height of the capacitor body is also decreased in order to address the aforementioned need for circuit boards to which electronic components have been connected, more ingenious ideas are required that can suppress cracking.

Background Art Literatures

[Patent Literature 1] Japanese Patent Laid-open No. 2015-037178

SUMMARY

An object of the present invention is to provide a multilayer ceramic capacitor whose capacitor body is not susceptible to cracking, even when each external electrode is shaped as one having no third part or fourth part (having only the first part and the second part) and the height of the capacitor body is also decreased.

Any discussion of problems and solutions involved in the related art has been included in this disclosure solely for the purposes of providing a context for the present invention, and should not be taken as an admission that any or all of the discussion were known at the time the invention was made.

In order to achieve the aforementioned object, the multilayer ceramic capacitor pertaining to the present invention is a multilayer ceramic capacitor comprising: a capacitor body of roughly rectangular solid shape which has a capacitive part constituted by multiple internal electrode layers stacked together with dielectric layers in between; a first external electrode which is provided on one length-direction face of the capacitor body and which is connected to some of the multiple internal electrode layers; and a second external electrode which is provided on the other length-direction face of the capacitor body and which is connected to the remainder of the multiple internal electrode layers; wherein the first external electrode has a first part provided on one height-direction face of the capacitor body and a second part provided on the other height-direction face of the capacitor body, and the second external electrode has a first part provided on one height-direction face of the capacitor body and a second part provided on the other height-direction face of the capacitor body; and when the reference length of the first part of the first external electrode is given by L1$a$, the reference length of the second part of the first external electrode is given by L1$b$, the reference length of the first part of the second external electrode is given by L2$a$, and the reference length of the second part of the second external electrode is given by L2$b$, then the reference length L1$a$ is set to a value different from that of the reference length L1$b$, while the reference length L2$a$ is set to a value different from that of the reference length L2$b$.

According to the multilayer ceramic capacitor pertaining to the present invention, a multilayer ceramic capacitor can be provided whose capacitor body is not susceptible to cracking, even when each external electrode is shaped as one having no third part or fourth part (having only the first part and the second part) and the height of the capacitor body is also decreased.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 15 is a drawing explaining an example of how the multilayer ceramic capacitor shown in FIGS. 10 to 12 is manufactured.

FIG. 16 is a drawing explaining an example of how the multilayer ceramic capacitor shown in FIGS. 10 to 12 is manufactured.

FIG. 17 is a drawing explaining how the prototypes corresponding to the multilayer ceramic capacitor shown in FIGS. 10 to 12 were tested for strength.

FIG. 18 is a table showing the strength test result of each of prototypes P1 and P28-P41.

FIG. 19A is a plan view, corresponding to FIG. 1, of the multilayer ceramic capacitor pertaining to the third embodiment of the present invention, while

FIG. 20A is a plan view, corresponding to FIG. 10, of the multilayer ceramic capacitor pertaining to the fourth embodiment of the present invention, while

DESCRIPTION OF THE SYMBOLS 10, 20, 30, 40—Multilayer ceramic capacitor, 11—Capacitor body, 11a—Capacitive part, 11a1—Internal electrode layer, 11a2—Dielectric layer, 11b—Dielectric margin part, 12—First external electrode, 12a—First part of the first external electrode, 12b—Second part of the first external electrode, 12c1—First base conductor film, 12c2—Second base conductor film, 12c3—Third base conductor film, 12d—Surface conductor film, 12d1—First wraparound part of the surface conductor film, 12d2—Second wraparound part of the surface conductor film, 13—Second external electrode, 13a—First part of the second external electrode, 13b—Second part of the second external electrode, 13c1—First base conductor film, 13c2—Second base conductor film, 13c3—Third base conductor film, 13d—Surface conductor film, 13d1—First wraparound part of the surface conductor film, 13d2—Second wraparound part of the surface conductor film, 14—First insulator film, 15—Second insulator film.

DETAILED DESCRIPTION OF EMBODIMENTS

First Embodiment

Figure 1:
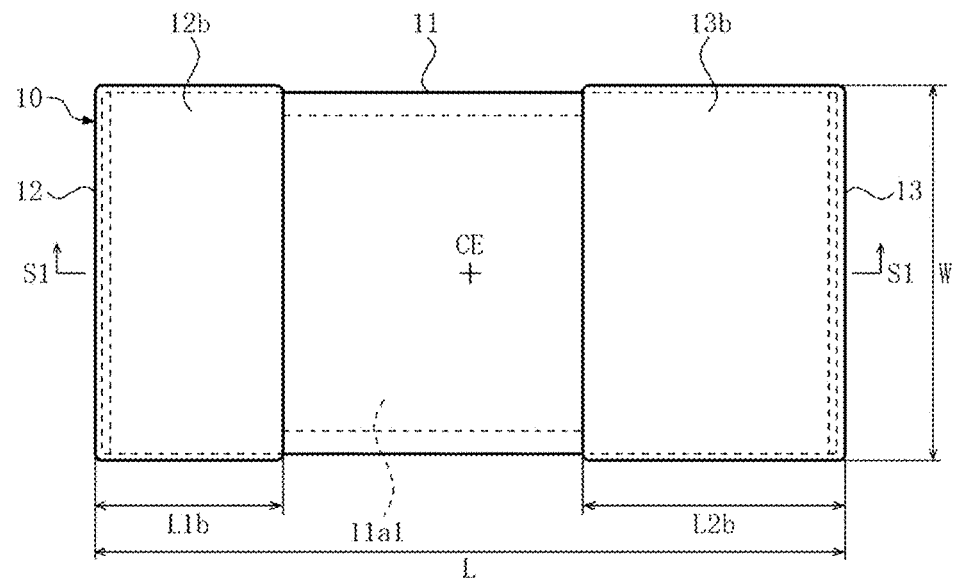
FIG. 1 is a plan view of the multilayer ceramic capacitor pertaining to the first embodiment of the present invention.
Figure 2:
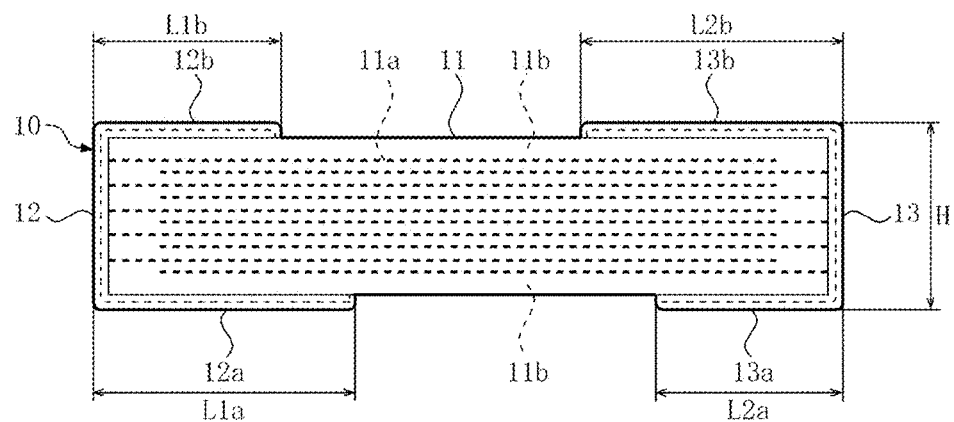
FIG. 2 is a side view, in the width direction, of the multilayer ceramic capacitor shown in FIG. 1.
Figure 3:
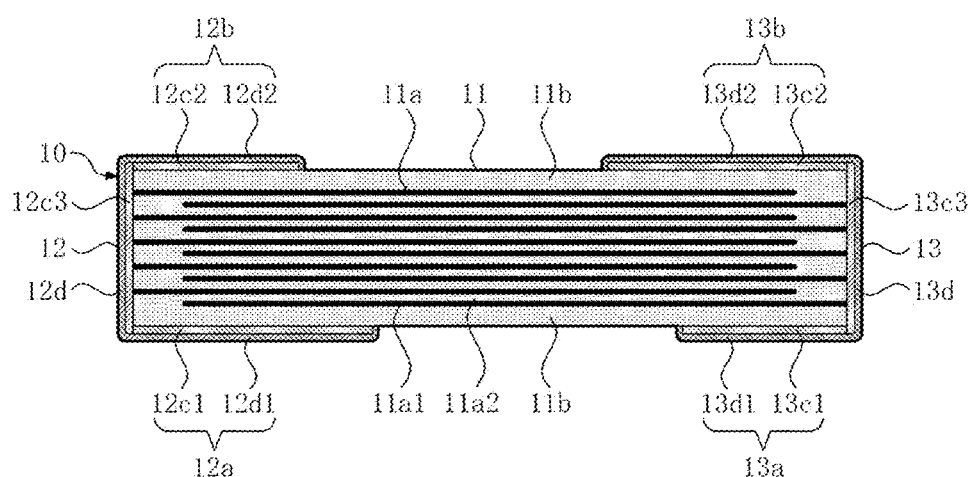
FIG. 3 is a cross-sectional view, along line S1-S1, of the multilayer ceramic capacitor shown in FIG. 1.

First, the structure of a multilayer ceramic capacitor 10 pertaining to the first embodiment of the present invention is explained using FIGS. 1 to 3. It should be noted that, in the following explanations including the explanation of this structure, the lateral direction in FIG. 1 is referred to as the "length direction," the vertical direction in FIG. 1 is referred to as the "width direction," and the vertical direction in FIG. 2 is referred to as the "height direction," while the dimensions along these length direction, width direction, and height direction are referred to as "length," "width," and "height," respectively. Also, in the following explanations including the explanation of this structure, the terms "reference length," "reference width," "reference height," "reference thickness," and "reference spacing" represent reference dimensions including no dimensional tolerance.

The size of the multilayer ceramic capacitor 10 shown in FIGS. 1 to 3 is specified by its reference length L, reference width W, and reference height H. For reference, the reference length L, reference width W, and reference height H of the prototypes on which FIGS. 1 to 3 are based, are 1000 μm, 500 μm, and 250 μm, respectively.

This multilayer ceramic capacitor 10 comprises a capacitor body 11 of roughly rectangular solid shape, a first external electrode 12 provided on one length-direction face (left face in FIGS. 1 to 3) of the capacitor body 11, and a second external electrode 13 provided on the other length-direction face (right face in FIGS. 1 to 3) of the capacitor body 11.

The first external electrode 12 has a first part 12a provided on one height-direction face (bottom face in FIGS. 2 and 3) of the capacitor body 11, and a second part 12b provided on the other height-direction face (top face in FIGS. 2 and 3) of the capacitor body 11. Similarly, the second external electrode 13 has a first part 13a provided on one height-direction face (bottom face in FIGS. 2 and 3) of the capacitor body 11, and a second part 13b provided on the other height-direction face (top face in FIGS. 2 and 3) of the capacitor body 11. It should be noted that in FIG. 1, although the first and second external electrodes 12, 13 appear to have a thickness on both width-direction faces (top and bottom faces in FIG. 1), this is because surface conductor films (12d, 13d) described later cover the width-direction edges of base conductor films (12c1, 12c2, 13c1, 13c2) described later, and both the first and second external electrodes have substantially no parts provided on either of the wide-direction faces.

The capacitor body 11 has a capacitive part 11a constituted by multiple internal electrode layers 11a1 stacked together with dielectric layers 11a2 in between, as well as dielectric margin parts 11b provided on both height-direction sides of the capacitive part 11a. Some of the multiple internal electrode layers 11a1 (odd-numbered ones from the top in FIG. 3) are connected to the first external electrode 12, while the remainder of the multiple internal electrode layers 11a1 (even-numbered ones from the top in FIG. 3) are connected to the second external electrode 13. It should be noted that, while FIGS. 2 and 3 depict a total of 10 internal electrode layers 11a1 for the purpose of illustration, the number of internal electrode layers 11a1 is not limited in any way.

Each internal electrode layer 11a1 has an outline of roughly rectangular shape. The reference length (not accompanied by symbol) of each internal electrode layer 11a1 is smaller than the reference length (not accompanied by symbol) of the capacitor body 11. The reference width (not accompanied by symbol) of each internal electrode layer 11a1 is smaller than the reference width (not accompanied by symbol) of the capacitor body 11. The reference thickness (not accompanied by symbol) of each internal electrode layer 11a1 is set in a range of 0.3 to 3 μm, for example.

Each dielectric layer 11a2 has an outline of roughly rectangular shape. The reference length (not accompanied by symbol) of each dielectric layer 11a2 is the same as the reference length (not accompanied by symbol) of the capacitor body 11. The reference width (not accompanied by symbol) of each dielectric layer 11a2 is the same as the reference width (not accompanied by symbol) of the capacitor body 11. The reference thickness (not accompanied by symbol) of each dielectric layer 11a2 is set in a range of 0.3 to 3 μm, for example.

Each dielectric margin part 11b has an outline of roughly rectangular shape. The reference length (not accompanied by symbol) of each dielectric margin part 11b is the same as the reference length (not accompanied by symbol) of the capacitor body 11. The reference width (not accompanied by symbol) of each dielectric margin part 11b is the same as the reference width (not accompanied by symbol) of the capacitor body 11. The reference thickness (not accompanied by symbol) of each dielectric margin part 11b is set in a range of 5 to 30 μm, for example.

The primary component of each internal electrode layer 11a1 is nickel, copper, palladium, platinum, silver, gold, alloy thereof, or other metal material, for example. The primary component of each dielectric layer 11a2 and that of each dielectric margin part 11b, or specifically the primary component of the capacitor body 11 excluding the internal electrode layers 11a1, is barium titanate, strontium titanate, calcium titanate, magnesium titanate, calcium zirconate, calcium titanate zirconate, barium zirconate, titanium oxide, or other dielectric material (dielectric ceramic material), for example.

The first external electrode 12 has a first base conductor film 12c1 provided on and in contact with one side of one height-direction face (left side of the bottom face in FIG. 3) of the capacitor body 11, a second base conductor film 12c2 provided on and in contact with one side of the other height-direction face (left side of the top face in FIG. 3) of the capacitor body 11, a third base conductor film 12c3 provided on and in contact with one length-direction face (left face in FIG. 3) of the capacitor body 11 and also in contact with the first base conductor film 12c1 and second base conductor film 12c2, and a surface conductor film 12d provided over, in a manner covering and in contact with, the entire surfaces of the first base conductor film 12c1, second base conductor film 12c2, and third base conductor film 12c3.

The first base conductor film 12c1 has an outline of roughly rectangular shape. The reference length (not accompanied by symbol) of the first base conductor film 12c1 is smaller than the reference length (not accompanied by symbol) of the capacitor body 11. The reference width (not accompanied by symbol) of the first base conductor film 12c1 is the same as the reference width (not accompanied by symbol) of the capacitor body 11. The reference thickness (not accompanied by symbol) of the first base conductor film 12c1 is set in a range of 2 to 6 μm, for example.

The second base conductor film 12c2 has an outline of roughly rectangular shape. The reference length (not accompanied by symbol) of the second base conductor film 12c2 is smaller than the reference length (not accompanied by symbol) of the first base conductor film 12c1. The reference width (not accompanied by symbol) of the second base conductor film 12c2 is the same as the reference width (not accompanied by symbol) of the capacitor body 11. The reference thickness (not accompanied by symbol) of the second base conductor film 12c2 is set in a range of 2 to 6 μm, for example.

The third base conductor film 12c3 has an outline of roughly rectangular shape. The reference width (not accompanied by symbol) of the third base conductor film 12c3 is the same as the reference width (not accompanied by symbol) of the capacitor body 11. The reference height (not accompanied by symbol) of the third base conductor film 12c3 is slightly larger than the reference height (not accompanied by symbol) of the capacitor body 11, and one end (bottom end in FIG. 3) of the third conductor film 12c3 in the height direction is in contact with one end (left end in FIG. 3) of the first base conductor film 12c1 in the length direction, while the other end (top end in FIG. 3) of the third conductor film 12c3 in the height direction is in contact with one end (left end in FIG. 3) of the second base conductor film 12c2 in the length direction. The reference thickness (not accompanied by symbol) of the third base conductor film 12c3 is set in a range of 2 to 10 μm, for example.

The primary component of the first base conductor film 12c1, that of the second base conductor film 12c2, and that of the third base conductor film 12c3, are all nickel, copper, palladium, platinum, silver, gold, alloy thereof, or other metal material, for example, or preferably the same metal material as the primary component of each internal electrode layer 11a1.

The surface conductor film 12d also covers both width-direction faces of the first base conductor film 12c1, second base conductor film 12c2, and third base conductor film 12c3, respectively, so its reference width (not accompanied by symbol) is slightly larger than the reference width (not accompanied by symbol) of the capacitor body 11. It should be noted that, while FIG. 3 depicts a surface conductor film 12d constituted by one film, a multilayer film constituted by two or more films may be adopted as the surface conductor film 12d. The reference thickness (not accompanied by symbol) of the surface conductor film 12d, which varies depending on the number of films constituting the surface conductor film 12d, is set in a range of 2 to 6 μm, for example.

If the surface conductor film 12d is constituted by one film, a film whose primary component is tin, copper, nickel, palladium, gold, zinc, alloy thereof, or other metal material, for example, may be used. Also, if the surface conductor film 12d is constituted by two films, a combination of a first film whose primary component is nickel, copper, palladium, platinum, silver, gold, alloy thereof, or other metal material, for example, and a second film whose primary component is tin, copper, nickel, palladium, gold, zinc, alloy thereof, or other metal material, for example, may be used. Furthermore, if the surface conductor film 12d is constituted by three films, a combination of a first film and a second film, whose primary components are both nickel, copper, palladium, platinum, silver, gold, alloy thereof, or other metal material, for example, and a third film whose primary component is tin, copper, nickel, palladium, gold, zinc, alloy thereof, or other metal material, for example, may be used.

As shown in FIGS. 2 and 3, the first part 12a of the first external electrode 12 is constituted by the first base conductor film 12c1, and by a part 12d1 of the surface conductor film 12d covering the first base conductor film 12c1 (hereinafter referred to as the first wraparound part 12d1). Also, the second part 12b of the first external electrode 12 is constituted by the second base conductor film 12c2, and by a part 12d2 of the surface conductor film 12d covering the second base conductor film 12c2 (hereinafter referred to as the second wraparound part 12d2).

Also, the reference length L1a of the first part 12a, and the reference length L1b of the second part 12b, of the first external electrode 12 are set to different values, respectively, where, specifically, the reference length L1a of the first part 12a, and the reference length L1b of the second part 12b, of the first external electrode 12 satisfy the relational expression of "L1a>L1b."

The second external electrode 13 has a first base conductor film 13c1 provided on and in contact with the other side of one height-direction face (right side of the bottom face in FIG. 3) of the capacitor body 11, a second base conductor film 13c2 provided on and in contact with the other side of the other height-direction face (right side of the top face in FIG. 3) of the capacitor body 11, a third base conductor film 13c3 provided on and in contact with the other length-direction face (right face in FIG. 3) of the capacitor body 11 and also in contact with the first base conductor film 13c1 and second base conductor film 13c2, and a surface conductor film 13d provided over, in a manner covering and in contact with, the entire surfaces of the first base conductor film 13c1, second base conductor film 13c2, and third base conductor film 13c3.

The first base conductor film 13c1 has an outline of roughly rectangular shape. The reference length (not accompanied by symbol) of the first base conductor film 13c1 is smaller than the reference length (not accompanied by symbol) of the capacitor body 11. The reference width (not accompanied by symbol) of the first base conductor film 13c1 is the same as the reference width (not accompanied by symbol) of the capacitor body 11. The reference thickness (not accompanied by symbol) of the first base conductor film 13c1 is set in a range of 2 to 6 μm, for example.

The second base conductor film 13c2 has an outline of roughly rectangular shape. The reference length (not accompanied by symbol) of the second base conductor film 13c2 is larger than the reference length (not accompanied by symbol) of the first base conductor film 13c1. The reference width (not accompanied by symbol) of the second base conductor film 13c2 is the same as the reference width (not accompanied by symbol) of the capacitor body 11. The reference thickness (not accompanied by symbol) of the second base conductor film 13c2 is set in a range of 2 to 6 μm, for example.

The third base conductor film 13c3 has an outline of roughly rectangular shape. The reference width (not accompanied by symbol) of the third base conductor film 13c3 is the same as the reference width (not accompanied by symbol) of the capacitor body 11. The reference height (not accompanied by symbol) of the third base conductor film 13c3 is slightly larger than the reference height (not accompanied by symbol) of the capacitor body 11, and one end (bottom end in FIG. 3) of the third conductor film 13c3 in the height direction is in contact with the other end (right end in FIG. 3) of the first base conductor film 13c1 in the length direction, while the other end (top end in FIG. 3) of the third conductor film 13c3 in the height direction is in contact with the other end (right end in FIG. 3) of the second base conductor film 13c2 in the length direction. The reference thickness (not accompanied by symbol) of the third base conductor film 13c3 is set in a range of 2 to 10 μm, for example.

The primary component of the first base conductor film 13c1, that of the second base conductor film 13c2, and that of the third base conductor film 13c3, are all nickel, copper, palladium, platinum, silver, gold, alloy thereof, or other metal material, for example, or preferably the same metal material as the primary component of each internal electrode layer 11a1.

The surface conductor film 13d also covers both width-direction faces of the first base conductor film 13c1, second base conductor film 13c2 and third base conductor film 13c3, respectively, so its reference width (not accompanied by symbol) is slightly larger than the reference width (not accompanied by symbol) of the capacitor body 11. It should be noted that, while FIG. 3 depicts a surface conductor film 13d constituted by one film, a multilayer film constituted by two or more films may be adopted as the surface conductor film 13d. The reference thickness (not accompanied by symbol) of the surface conductor film 13d, which varies depending on the number of films constituting the surface conductor film 13d, is set in a range of 2 to 6 μm, for example.

If the surface conductor film 13d is constituted by one film, a film whose primary component is tin, copper, nickel, palladium, gold, zinc, alloy thereof, or other metal material, for example, may be used. Also, if the surface conductor film 13d is constituted by two films, a combination of a first film whose primary component is nickel, copper, palladium, platinum, silver, gold, alloy thereof, or other metal material, for example, and a second film whose primary component is tin, copper, nickel, palladium, gold, zinc, alloy thereof, or other metal material, for example, may be used. Furthermore, if the surface conductor film 13d is constituted by three films, a combination of a first film and a second film, whose primary components are both nickel, copper, palladium, platinum, silver, gold, alloy thereof, or other metal material, for example, and a third film whose primary component is tin, copper, nickel, palladium, gold, zinc, alloy thereof, or other metal material, for example, may be used.

As shown in FIGS. 2 and 3, the first part 13a of the second external electrode 13 is constituted by the first base conductor film 13c1, and by a part 13d1 of the surface conductor film 13d covering the first base conductor film 13c1 (hereinafter referred to as the first wraparound part 13d1). Also, the second part 13b of the second external electrode 13 is constituted by the second base conductor film 13c2, and by a part 13d2 of the surface conductor film 13d covering the second base conductor film 13c2 (hereinafter referred to as the second wraparound part 13d2).

Also, the reference length L2a of the first part 13a, and the reference length L2b of the second part 13b, of the second external electrode 13 are set to different values, respectively, where, specifically, the reference length L2a of the first part 13a, and the reference length L2b of the second part 13b, of the second external electrode 13 satisfy the relational expression of "L2a<L2b."

It should be noted that, while FIGS. 1 to 3 depict that the reference length L1a of the first part 12a of the first external electrode 12 is the same as the reference length L2b of the second part 13b of the second external electrode 13, and the reference length L1b of the second part 12b of the first external electrode 12 is the same as the reference length L2a of the first part 13a of the second external electrode 13, the reference length L1a of the first part 12a of the first external electrode 12 may be different from the reference length L2b of the second part 13b of the second external electrode 13, and the reference length L1b of the second part 12b of the first external electrode 12 may be different from the reference length L2a of the first part 13a of the second external electrode 13.

Now, supplemental information is provided regarding the reference length L1a of the first part 12a, and the reference length L1b of the second part 12b, of the first external electrode 12, as well as the reference length L2a of the first part 13a, and the reference length L2b of the second part 13b, of the second external electrode 13.

<Lower Limit of the Reference Length L1b of the Second Part 12b of the First External Electrode 12, and Lower Limit of the Reference Length L2a of the First Part 13a of the Second External Electrode 13>

The first part 12a and second part 12b of the first external electrode 12, and the first part 13a and second part 13b of the second external electrode 13, are used when the multilayer ceramic capacitor 10 is placed on the surface of, or embedded in, a circuit board (not illustrated) and connected to wiring.

According to the connection techniques currently available, such as solder connection and via connection (plating connection), the aforementioned wiring can be achieved without hindrance, without inducing any problem at all, so long as the reference length L1b of the second part 12b, which represents the smaller of the reference lengths of the two parts of the first external electrode 12, is set to 100 µm or more, and the reference length L2a of the first part 13a, which represents the smaller of the reference lengths of the two parts of the second external electrode 13, is set to 100 µm or more, regardless of the size of the reference length L of the multilayer ceramic capacitor 10.

<Upper Limit of the Reference Length L1a of the First Part 12a of the First External Electrode 12, and Upper Limit of the Reference Length L2b of the Second Part 13b of the Second External Electrode 13>

When the multilayer ceramic capacitor 10 is placed on the surface of, or embedded in, a circuit board (not illustrated) and connected to wiring using solder or other bonding material, setting the reference spacing (not accompanied by symbol) smaller between the first part 12a of the first external electrode 12 and the first part 13a of the second external electrode 13, as well as the reference spacing (not accompanied by symbol) smaller between the second part 12b of the first external electrode 12 and the second part 13b of the second external electrode 13, increases the chances of the first parts 12a and 13a shorting with each other, while also increasing the chances of the second parts 12b and 13b shorting each other, due to scattering of bonding material, etc.

In addition, the reference length L1a of the first part 12a, and the reference length L1b of the second part 12b, of the first external electrode 12, as well as the reference length L2a of the first part 13a, and the reference length L2b of the second part 13b, of the second external electrode 13, all have the below-mentioned dimensional tolerances in reality. Accordingly, setting the aforementioned reference spacings smaller increases the chances of the first parts 12a and 13a shorting with each other, while also increasing the chances of the second parts 12b and 13b shorting each other, due to cumulative plus-side dimensional tolerances.

According to the manufacturing techniques currently available, the aforementioned shorting can be avoided without hindrance, so long as the aforementioned reference spacings are set to 100 µm or more. In other words, preferably the reference length L1a of the first part 12a of the first external electrode 12, and the reference length L2a of the first part 13a of the second external electrode 13, are set in a manner satisfying the relational expression "(L1a+L2a)≤(L−100 µm)," regardless of the size of the reference length L of the multilayer ceramic capacitor 10. Similarly, preferably the reference length L1b of the second part 12b of the first external electrode 12, and the reference length L2b of the second part 13b of the second external electrode 13, are set in a manner satisfying the relational expression "(L1b+L2b)≤(L−100 µm)."

It should be noted that the upper limit of the reference length L1a of the first part 12a of the first external electrode 12 can be derived by assigning the values of L and L2a to the aforementioned relational expression "(L1a+L2a)≤(L−100 µm)," while the upper limit of the reference length L2b of the second part 13b of the second external electrode 13 can be derived by assigning the values of L and L1b to the aforementioned relational expression "(L1b+L2b)≤(L−100 µm)."

<The Dimensional Relationship Between the Reference Length L1a of the First Part 12a, and the Reference Length L1b of the Second Part 12b, of the First External Electrode 12 (L1a>L1b), and the Dimensional Relationship Between the Reference Length L2a of the First Part 13a, and the Reference Length L2b of the Second Part 13b, of the Second External Electrode 13 (L2A<L2b)>

When the multilayer ceramic capacitor 10 is placed on the surface of, or embedded in, a circuit board (not illustrated)

using a mounter (not illustrated), an external force is applied to the multilayer ceramic capacitor 10 from the mounter. Also, when the multilayer ceramic capacitor 10 is connected to a circuit board (not illustrated), an external force is applied to the multilayer ceramic capacitor 10 from the circuit board based on thermal expansion and contraction, etc., of the circuit board. As these external forces are applied to the multilayer ceramic capacitor 10, the multilayer ceramic capacitor 10 warps, primarily in the height direction, and internal forces generate in the multilayer ceramic capacitor 10 in association with this warping.

The first external electrode 12 has a shape having the first part 12a and the second part 12b, while the second external electrode 13 has a shape having the first part 13a and the second part 13b, and accordingly the aforementioned internal forces concentrate in:

A location (referred to as "SP11") near the other length-direction end (right end in FIGS. 2 and 3) of the first part 12a of the first external electrode 12 on one height-direction face (bottom face in FIGS. 2 and 3) of the capacitor body 11;

A location (referred to as "SP12") near one length-direction end (left end in FIGS. 2 and 3) of the first part 13a of the second external electrode 13 on one height-direction face (bottom face in FIGS. 2 and 3) of the capacitor body 11;

A location (referred to as "SP13") near the other length-direction end (right end in FIGS. 2 and 3) of the second part 12b of the first external electrode 12 on the other height-direction face (top face in FIGS. 2 and 3) of the capacitor body 11; and A location (referred to as "SP14") near one length-direction end (left end in FIGS. 2 and 3) of the second part 13b of the second external electrode 13 on the other height-direction face (top face in FIGS. 2 and 3) of the capacitor body 11.

This means that, if the reference length L1a of the first part 12a, and the reference length L1b of the second part 12b, of the first external electrode 12 are set to the same value, the chances are higher that the internal force concentration locations SP11 and SP13 line up on a straight line along the height direction of the capacitor body 11, and therefore these locations become susceptible to cracking. Similarly, if the reference length L2a of the first part 13a, and the reference length L2b of the second part 13b, of the second external electrode 13 are set to the same value, the chances are higher that the internal force concentration locations SP12 and SP14 line up on a straight line along the height direction of the capacitor body 11, and therefore these locations become susceptible to cracking.

On the other hand, if the reference length L1a of the first part 12a, and the reference length L1b of the second part 12b, of the first external electrode 12 satisfy the aforementioned relational expression "L1a>L1b," the chances are lower that the internal force concentration locations SP11 and SP13 line up on a straight line along the height direction of the capacitor body 11, and therefore these locations are no longer susceptible to cracking. Similarly, if the reference length L2a of the first part 13a, and the reference length L2b of the second part 13b, of the second external electrode 13 satisfy the aforementioned relational expression "L2a<L2b," the chances are lower that the internal force concentration locations SP12 and SP14 line up on a straight line along the height direction of the capacitor body 11, and therefore these locations are no longer susceptible to cracking.

It should be noted that, even when the reference length L1a of the first part 12a, and the reference length L1b of the second part 12b, of the first external electrode 12 satisfy the aforementioned relational expression "L1a>L1b," and the reference length L2a of the first part 13a, and the reference length L2b of the second part 13b, of the second external electrode 13 also satisfy the aforementioned relational expression "L2a<L2b," the actual dimensions of the reference lengths L1a, L1b, L2a, and L2b may satisfy the relationships "Actual dimension of L1a<Actual dimension of L1b" and "Actual dimension of L2a>Actual dimension of L2b," especially if the dimensional difference between the reference lengths L1a and L1b, and the dimensional difference between the reference lengths L2a and L2b, are small, because of the impact of the actual dimensional tolerance (a maximum of ±5% based on the manufacturing technology currently available).

The above is explained using an example below. By setting the smaller reference lengths L1b and L2a of the first external electrode 12 and the second external electrode 13 to 100 μm, respectively, and the larger reference lengths L1a and L2b to 110 μm, respectively, the actual dimension of the smaller reference lengths L1b and L2a may become 105 μm (100 μm+5 μm) and the actual dimension of the larger reference lengths L1a and L2b may become 104.5 μm (110 μm−5.5 μm), which is smaller than 105 μm, when the aforementioned dimensional tolerance is taken into account.

To avoid such impact of dimensional tolerance, preferably the larger reference length L1a is set to 1.12 or more times the smaller reference length L1b, and preferably the larger reference length L2b is set to 1.12 or more times the smaller reference length L2a. This way, "Actual dimension of L1a>Actual dimension of L1b" and "Actual dimension of L2a<Actual dimension of L2b" can be achieved even when the dimensional difference between the reference lengths L1a and L1b, and the dimensional difference between the reference lengths L2a and L2b, are small.

Next, an example of how the multilayer ceramic capacitor 10 is manufactured, or specifically an example of how it is manufactured when the primary component of the capacitor body 11 excluding the internal electrode layers 11a1 is barium titanate, the primary component of each internal electrode layer 11a1, primary component of each first base conductor film 12c1 or 13c1, primary component of each second base conductor film 12c2 or 13c2, and primary component of each third base conductor film 12c3 or 13c3, are all nickel, and the primary component of each surface conductor film 12d or 13d is tin, is explained using FIGS. 4A to 7 and also by quoting the symbols shown in FIGS. 1 to 3. It should be noted that the manufacturing method explained here is only an example and does not limit in any way how the multilayer ceramic capacitor 10 is manufactured.

For the manufacturing, a ceramic slurry containing barium titanate powder, organic solvent, organic binder, dispersant, etc., as well as an electrode paste containing nickel powder, organic solvent, organic binder, dispersant, etc., are prepared.

Figure 4A:
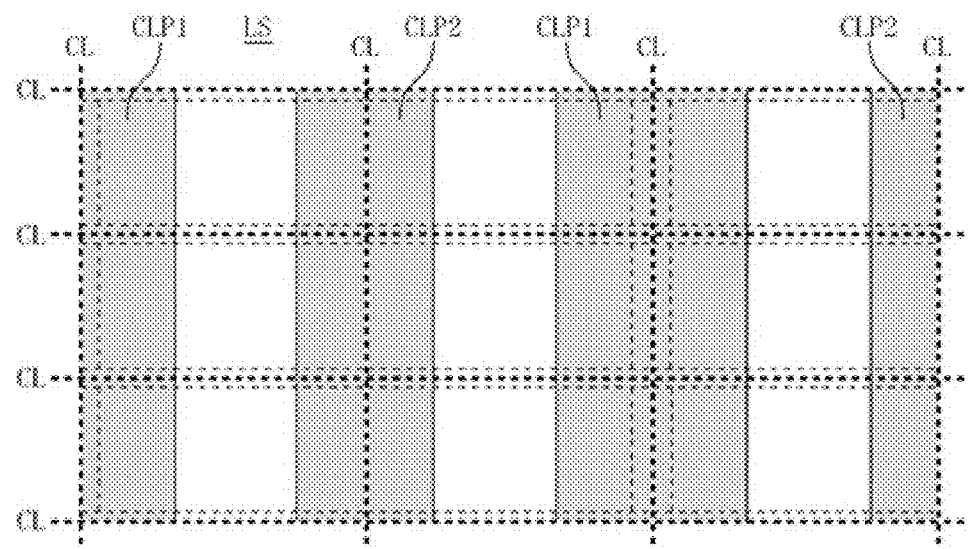
FIGS. 4A and 4B are drawings explaining an example of how the multilayer ceramic capacitor shown in FIGS. 1 to 3 is manufactured.
Figure 4B:
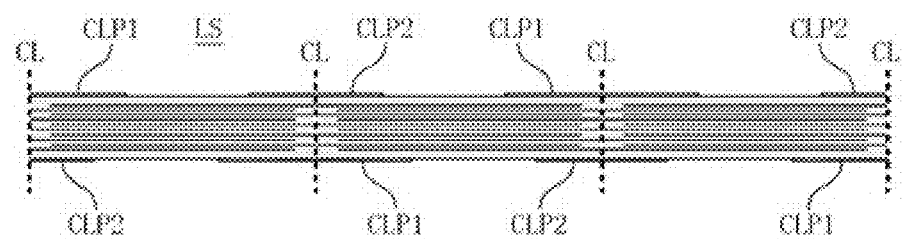

Next, the ceramic slurry is coated on the surface of a carrier film and then dried, to produce a first sheet having a green sheet formed on the carrier film. Also, the electrode paste is printed on the surface of the green sheet of the first sheet and then dried, to form a second sheet having unsintered matrix or zigzag internal electrode layer patterns formed on the surface of the green sheet of the first sheet. These unsintered internal electrode layer patterns are constituted by unsintered internal electrode layer patterns (not accompanied by symbol), each having a reference length of approx. twice that of the internal electrode layer 11a1, as shown in FIGS. 4A and 4B. Furthermore, the electrode paste is printed on the surface of the green sheet of the first sheet and then dried, to produce a third sheet having unsintered striped base conductor film patterns on the surface of the green sheet of the first sheet. These unsintered base conductor film patterns are constituted by base conductor film patterns CLP1 having the larger length (lateral-direction dimension in FIGS. 4A and 4B) and base conductor film patterns CLP2 having the smaller length (lateral-direction dimension in FIGS. 4A and 4B), as shown in FIGS. 4A and 4B. The unsintered base conductor film patterns CLP1 of the larger length (lateral-direction dimension in FIGS. 4A and 4B) have a reference length of approx. twice that of the first base conductor film 12c1 or second base conductor film 13c2, while the unsintered base conductor film patterns CLP2 of the smaller length (lateral-direction dimension in FIGS. 4A and 4B) have a reference length of approx. twice that of the second base conductor film 12c2 or first base conductor film 13c1.

Next, a specified number of unit sheets taken from the green sheet of the first sheet are stacked and thermally compressed together, one by one, to form an area corresponding to one dielectric margin part 11b in the height direction. Then, a specified number of unit sheets (including the unsintered internal electrode layer patterns) taken from the green sheet of the second sheet are stacked and thermally compressed together, one by one, to form an area corresponding to the capacitive part 11a. Then, a specified number of unit sheets taken from the green sheet of the first sheet are stacked and thermally compressed together, one by one, to form an area corresponding to the other dielectric margin part 11b in the height direction. Then, unit sheets (including the unsintered base conductor film patterns) taken from the green sheet of the third sheet are stacked on both height-direction faces of the above, and thermally compressed together. Finally, all of the sheets are thermally compressed for one last time, to produce an unsintered multilayer sheet LS (refer to FIGS. 4A and 4B).

Figure 5:
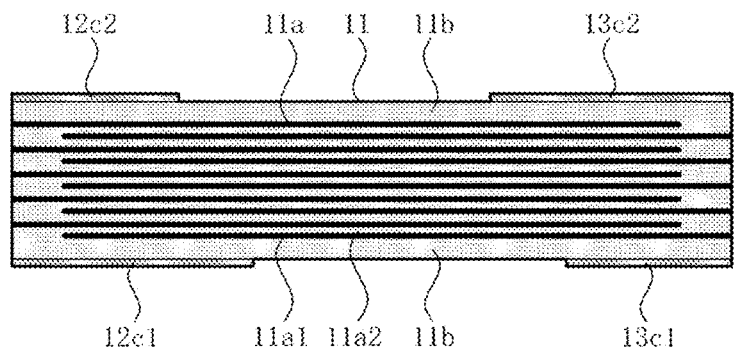
FIG. 5 is a drawing explaining an example of how the multilayer ceramic capacitor shown in FIGS. 1 to 3 is manufactured.

Next, the unsintered multilayer sheet is cut into a grid along cutting lines CL (refer to FIGS. 4A and 4B), to produce unsintered capacitor bodies, each corresponding to the capacitor body 11 (refer to FIG. 5). Provided on one height-direction face (bottom face in FIG. 5) of each such unsintered capacitor body is an unsintered first base conductor film corresponding to each first base conductor film 12c1 or 13c1, while provided on the other height-direction face (top face in FIG. 5) of the unsintered capacitor body is an unsintered second base conductor film corresponding to each second base conductor film 12c2 or 13c2.

Figure 6:
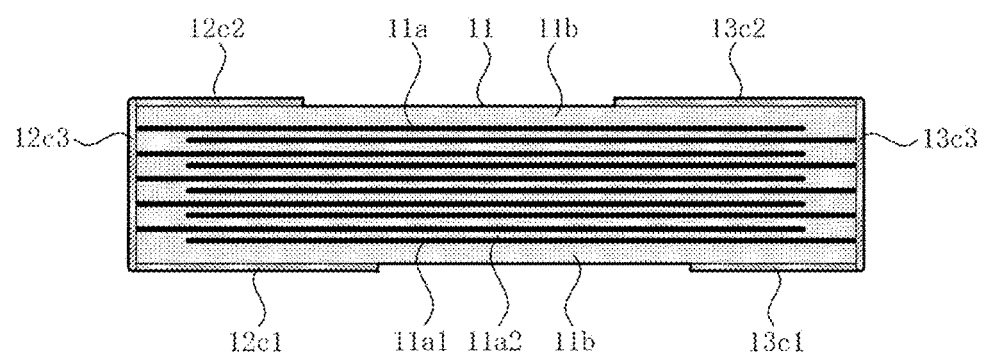
FIG. 6 is a drawing explaining an example of how the multilayer ceramic capacitor shown in FIGS. 1 to 3 is manufactured.

Next, the electrode paste is applied by means of dip-coating, coating, or printing, and then dried, to form an unsintered third base conductor film corresponding to each third base conductor film 12c3 or 13c3, on both length-direction faces of the unsintered capacitor body (refer to FIG. 6).

Next, the many unsintered capacitor bodies having the unsintered first base conductor films, second base conductor films, and third base conductor films, are put in a sintering oven and sintered (including binder removal and sintering) all at once in a reducing ambience based on a temperature profile appropriate for barium titanate and nickel, to produce capacitor bodies 11, each having each of the first base conductor films 12c1 and 13c1, each of the second base conductor films 12c2 and 13c2, and each of the third base conductor films 12c3 and 13c3 (refer to FIG. 6).

Figure 7:
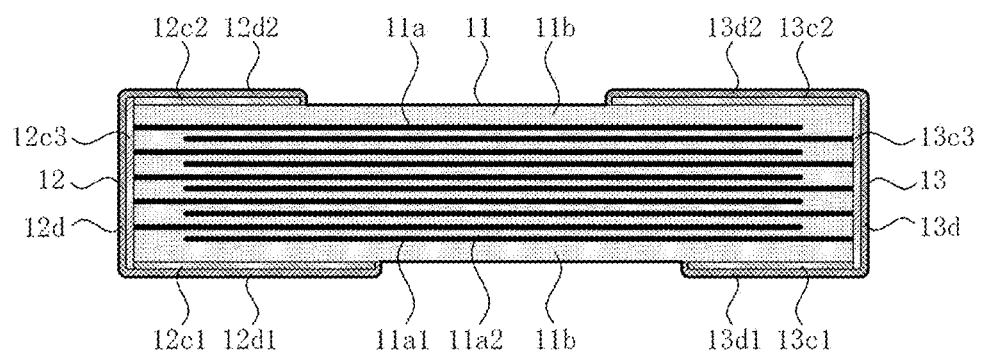
FIG. 7 is a drawing explaining an example of how the multilayer ceramic capacitor shown in FIGS. 1 to 3 is manufactured.

Next, the wet plating method or dry plating method is used to form a surface conductor film 12d covering the entire surfaces of the first base conductor film 12c1, second base conductor film 12c2 and third base conductor film 12c3, and also form a surface conductor film 13d covering the entire surfaces of the first base conductor film 13c1, second base conductor film 13c2 and third base conductor film 13c3 (refer to FIG. 7). This completes the manufacturing of the multilayer ceramic capacitor 10.

It should be noted that the unsintered capacitor body shown in FIG. 5 may be sintered to produce a capacitor body 11 first, and then each of the third base conductor films 12c3 and 13c3 may be formed on both length-direction faces of this capacitor body 11.

Next, the effects achieved by the multilayer ceramic capacitor 10 are explained.

(E11) The multilayer ceramic capacitor 10 comprises a first external electrode 12 having a first part 12a that wraps around onto one height-direction face of the capacitor body 11 and a second part 12b that wraps around onto the other height-direction face of the capacitor body 11, as well as a second external electrode 13 having a first part 13a that wraps around onto one height-direction face of the capacitor body 11 and a second part 13b that wraps around onto the other height-direction face of the capacitor body 11. Also, the reference length L1a of the first part 12a, and the reference length L1b of the second part 12b, of the first external electrode 12, satisfy the relational expression "L1a>L1b," while the reference length L2a of the first part 13a, and the reference length L2b of the second part 13b, of the second external electrode 13, satisfy the relational expression "L2a<L2b."

This means that, even when the multilayer ceramic capacitor 10 warps due to the external forces described above and internal forces generate in the multilayer ceramic capacitor 10 due to this warping, the chances are lower that the internal force concentration locations SP11 and SP13 line up on a straight line along the height direction of the capacitor body 11, and therefore these locations are no longer susceptible to cracking. Similarly, the chances are lower that the internal force concentration locations SP12 and SP14 line up on a straight line along the height direction of the capacitor body 11, and therefore these locations are no longer susceptible to cracking.

(E12) With the multilayer ceramic capacitor 10, the reference length L1a of the first part 12a of the first external electrode 12 is the same as the reference length L2b of the second part 13b of the second external electrode 13, while the reference length L1b of the second part 12b of the first external electrode 12 is the same as the reference length L2a of the first part 13a of the second external electrode 13.

In other words, the mode of the first part 12a of the first external electrode 12 and that of the first part 13a of the second external electrode 13 on one height-direction face of the multilayer ceramic capacitor 10, are the same as the mode of the second part 12b of the first external electrode 12 and that of the second part 13b of the second external electrode 13 on the other height-direction face of the multilayer ceramic capacitor 10 on the reference length level. Accordingly, the height-direction orientation of the multilayer ceramic capacitor 10 need not be controlled when the multilayer ceramic capacitor 10 is placed on the surface of, or embedded in, a circuit board and connected to wiring.

(E13) With the multilayer ceramic capacitor 10 (reference length L), the reference length L1a of the first part 12a of the first external electrode 12 and the reference length L2a of the first part 13a of the second external electrode 13 satisfy the relational expression "$(L1a+L2a) \leq (L-100\ \mu m)$," while the reference length $L1b$ of the second part 12b of the first external electrode 12 and the reference length $L2b$ of the second part 13b of the second external electrode 13 satisfy the relational expression "$(L1b+L2b) \leq (L-100\ \mu m)$."

This means that, when the multilayer ceramic capacitor 10 is placed on the surface of, or embedded in, a circuit board (not illustrated) and connected to wiring, the aforementioned shorting of the first part 12a of the first external electrode 12 and the first part 13a of the second external electrode 13, or shorting of the second part 12b of the first external electrode 12 and the second part 13b of the second external electrode 13, which may be caused by scattering of bonding material or by dimensional tolerance as mentioned above, can be avoided without fail.

(E14) With the multilayer ceramic capacitor 10, the reference length $L1a$ of the first part 12a is set to 1.12 times or more the reference length $L1b$ of the second part 12b, with respect to the first external electrode 12, while the reference length $L2b$ of the second part 13a is set to 1.12 or more times the reference length $L2a$ of the first part 13a, with respect to the second external electrode 13.

This means that, even when the dimensional difference between the reference length $L1a$ of the first part 12a, and the reference length $L1b$ of the second part 12b, of the first external electrode 12, is small, and so is the dimensional difference between the reference length $L2a$ of the first part 13a, and the reference length $L2b$ of the second part 13b, of the second external electrode 13, the aforementioned relationship of "Actual dimension of $L1a$<Actual dimension of $L1b$" or "Actual dimension of $L2a$>Actual dimension of $L2b$," which may result from the impact of dimensional tolerance as mentioned above, can be avoided without fail.

Figures 8, 9:
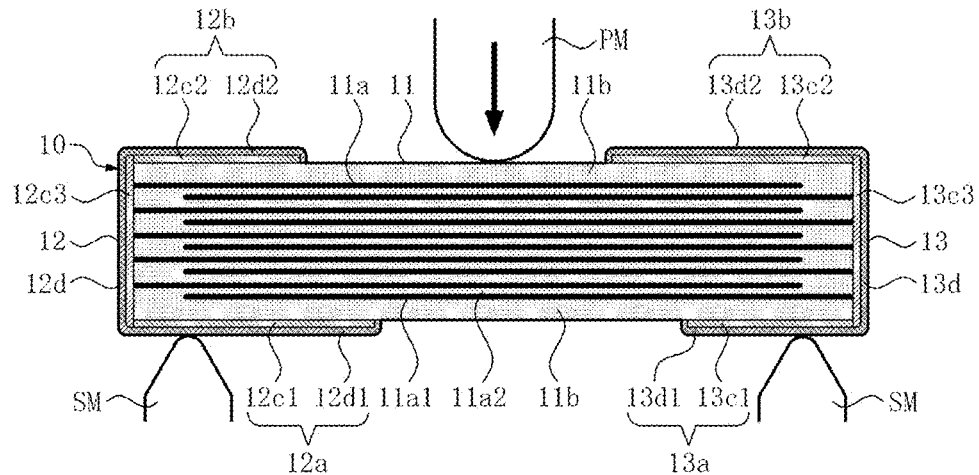
FIG. 8 is a drawing explaining how the prototypes corresponding to the multilayer ceramic capacitor shown in FIGS. 1 to 3 were tested for strength.
FIG. 9 is a table showing the strength test result of each of prototypes P1-P27.

Next, the results of verifying the effect E11 (suppression of cracking) are explained using FIGS. 8 and 9 and also by quoting the symbols used in FIGS. 1 to 3.

For the verification, 100 units each of Prototypes P1 to P27 (refer to FIG. 9), all corresponding to the multilayer ceramic capacitor 10 shown in FIGS. 1 to 3, were produced according to the aforementioned example of manufacturing method. It should be noted that, in FIG. 9, Prototype P1 is a control (reference or comparative example). With Prototypes P1 to P27, the reference length L, reference width W, and reference height H are 1000 μm, 500 μm, and 250 μm, respectively, and their capacitor bodies 11 all have the same structure. Also, with Prototypes P1 to P27, the reference length $L1b$ of the second part 12b of the first external electrode 12, and the reference length $L2a$ of the first part 13a of the second external electrode 13, are all 250 μm (refer to FIG. 9). Furthermore, Prototype P1 is such that the reference length $L1a$ of the first part 12a of the first external electrode 12 and the reference length $L2b$ of the second part 13b of the second external electrode 13 are set to 250 μm, while Prototypes P2 to P27 are such that the reference length $L1a$ of the first part 12a of the first external electrode 12 and the reference length $L2b$ of the second part 13b of the second external electrode 13 are set incrementally larger than 250 μm in a range of 260 to 730 μm (refer to FIG. 9).

As for the verification method, as shown in FIG. 8, first the 100 units of Prototype P1 were each supported with two support members SM on one height-direction face, and in this condition, the center of the other height-direction face (refer to CE in FIG. 1) was pressed with a pressing member PM and the average of pressing forces that caused cracking (base pressing force) was calculated. Then, a similar pressing test was conducted on 100 units each of Prototypes P2 to P27, and the number of units that cracked under the base pressing force was counted. In the "Strength test result" column in FIG. 9, the fields of Prototypes P2 to P27 each show this count in the format of n/100. It should be noted that Prototype P1 is the control for calculating the base pressing force, so the field of Prototype P1 in the "Strength test result" column in FIG. 9 shows "- - - ."

As is evident from the strength test results in FIG. 9, cracking was sufficiently suppressed in Prototypes P2 to P27 satisfying the relational expression "$L1a$>$L1b$" as well as the relational expression "$L2a$<$L2b$."

Among Prototypes P2 to P27, a small number of cracks generated in Prototypes P2 and P3; however, this probably has to do with the impact of dimensional tolerance as mentioned above. Also, although no cracks were found in Prototypes P4 to P27, it would be difficult to avoid the aforementioned shorting in Prototypes P24 to P27 where the reference spacing between the first part 12a of the first external electrode 12 and the first part 13a of the second external electrode 13 is all less than 100 μm. In other words, among Prototypes P2 to P27 satisfying the relational expression "$L1a$>$L1b$" and the relational expression "$L2a$<$L2b$," Prototypes P4 to P23 are more practical.

It should be noted that, although the reference length $L1b$ of the second part 12b of the first external electrode 12, and the reference length $L2a$ of the first part 13a of the second external electrode 13, were both set to 250 μm for all of Prototypes P2 to P27 in the aforementioned verification, it has been confirmed that an effect similar to the one mentioned above (suppression of cracking) could be achieved even when these reference lengths $L1b$ and $L2a$ are both set to a value other than 250 μm, or specifically 100 μm, 150 μm, 200 μm, 300 μm, or 350 μm, so long as the relational expression "$L1a$>$L1b$" and the relational expression "$L2a$<$L2b$" are both satisfied.

Second Embodiment

Figure 10:
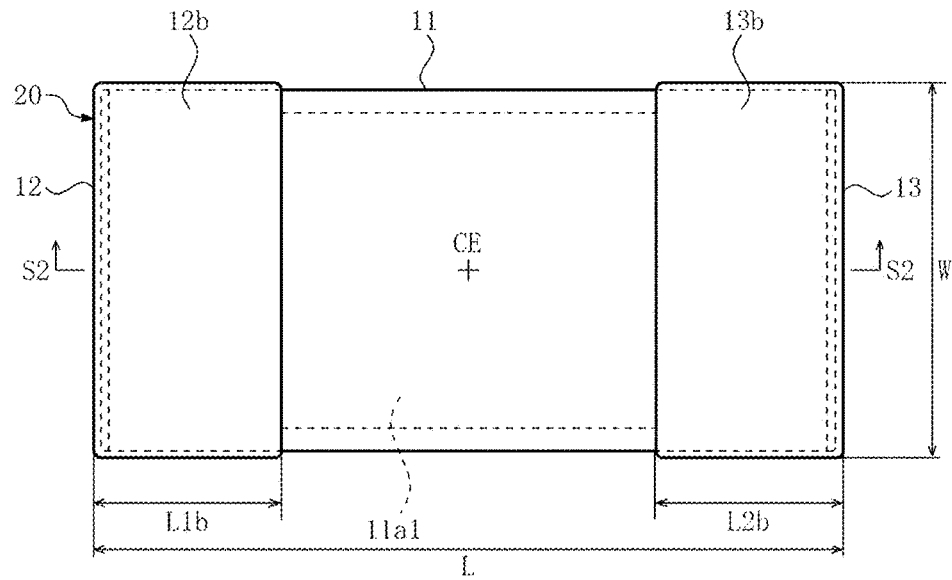
FIG. 10 is a plan view of the multilayer ceramic capacitor pertaining to the second embodiment of the present invention.
Figure 11:
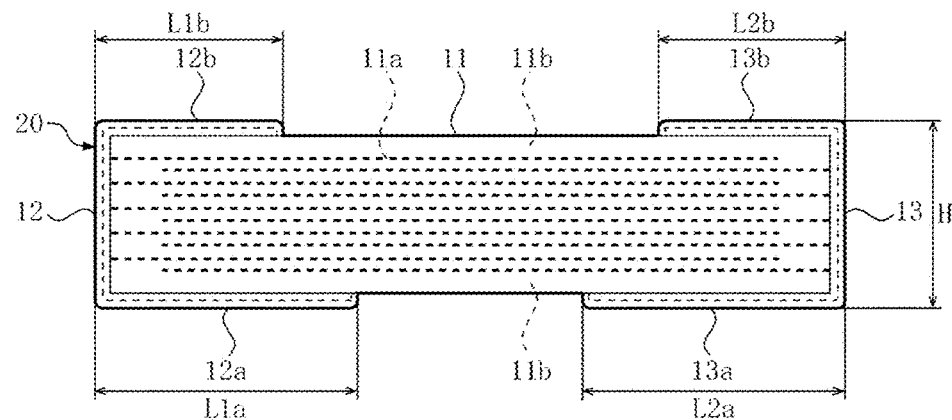
FIG. 11 is a side view, in the width direction, of the multilayer ceramic capacitor shown in FIG. 10.
Figure 12:
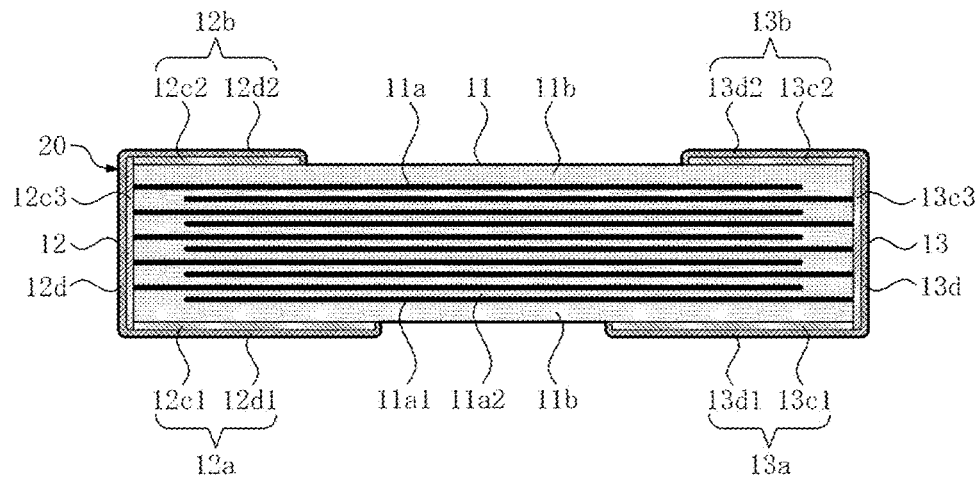
FIG. 12 is a cross-sectional view, along line S2-S2, of the multilayer ceramic capacitor shown in FIG. 10.

First, the structure of a multilayer ceramic capacitor 20 pertaining to the second embodiment of the present invention is explained using FIGS. 10 to 12. It should be noted that, in the following explanations including the explanation of this structure, the lateral direction in FIG. 10 is referred to as the "length direction," the vertical direction in FIG. 10 is referred to as the "width direction, and the vertical direction in FIG. 11 is referred to as the "height direction," while the dimensions along these length direction, width direction, and height direction are referred to as "length," "width," and "height," respectively. Also, in the following explanations including the explanation of this structure, the terms "reference length," "reference width," "reference height," "reference thickness," and "reference spacing" represent reference dimensions including no dimensional tolerance.

The size of the multilayer ceramic capacitor 20 shown in FIGS. 10 to 12 is specified by its reference length L, reference width W, and reference height H. For reference, the reference length L, reference width W, and reference height H of the prototypes on which FIGS. 10 to 12 are based, are 1000 μm, 500 μm and 250 μm, respectively.

This multilayer ceramic capacitor 20 is structurally different from the multilayer ceramic capacitor 10 pertaining to the first embodiment in that the reference length $L1a$ of the first part 12a, and the reference length $L1b$ of the second part 12b, of the first external electrode 12 are set to different values, respectively, and that, although the reference length $L1a$ of the first part 12a, and the reference length $L1b$ of the second part 12b, of the first external electrode 12 satisfy the relational expression "L1a>L1b," the reference length L2a of the first part 13a, and the reference length L2b of the second part 13b, of the second external electrode 13 satisfy the relational expression "L2a>L2b." The remainder of the structure is the same as that of the multilayer ceramic capacitor 10 pertaining to the first embodiment, and therefore is denoted using the same symbols and not explained.

It should be noted that, while FIGS. 10 to 12 depict that the reference length L1a of the first part 12a of the first external electrode 12 is the same as the reference length L2a of the first part 11a of the second external electrode 13, and the reference length L1b of the second part 12b of the first external electrode 12 is the same as the reference length L2b of the second part 13b of the second external electrode 13, the reference length L1a of the first part 12a of the first external electrode 12 may be different from the reference length L2a of the first part 13a of the second external electrode 13, and the reference length L1b of the second part 12b of the first external electrode 12 may be different from the reference length L2b of the second part 13b of the second external electrode 13.

Now, supplemental information is provided regarding the reference length L1a of the first part 12a, and the reference length L1b of the second part 12b, of the first external electrode 12, as well as the reference length L2a of the first part 13a, and the reference length L2b of the second part 13b, of the second external electrode 13.

<Lower Limit of the Reference Length L1b of the Second Part 12b of the First External Electrode 12, and Lower Limit of the Reference Length L2b of the Second Part 13a of the Second External Electrode 13>

The first part 12a and second part 12b of the first external electrode 12, and the first part 13a and second part 13b of the second external electrode 13, are used when the multilayer ceramic capacitor 20 is placed on the surface of, or embedded in, a circuit board (not illustrated) and connected to wiring.

According to the connection techniques currently available, such as solder connection and via connection (plating connection), the aforementioned wiring can be achieved without hindrance, without inducing any problem at all, so long as the reference length L1b of the second part 12b, which represents the smaller of the reference lengths of the two parts of the first external electrode 12, is set to 100 μm or more, and the reference length L2b of the second part 13b, which represents the smaller of the reference lengths of the two parts of the second external electrode 13, is set to 100 μm or more, regardless of the size of the reference length L of the multilayer ceramic capacitor 20.

<Upper Limit of the Reference Length L1a of the First Part 12a of the First External Electrode 12, and Upper Limit of the Reference Length L2a of the First Part 13a of the Second External Electrode 13>

When the multilayer ceramic capacitor 20 is placed on the surface of, or embedded in, a circuit board (not illustrated) and connected to wiring using solder or other bonding material, setting the reference spacing (not accompanied by symbol) smaller between the first part 12a of the first external electrode 12 and the first part 13a of the second external electrode 13, which respectively represent the larger reference lengths of the first external electrode 12 and the second external electrode 13, increases the chances of the first parts 12a and 13a shorting with each other due to scattering of bonding material, etc.

In addition, the reference length L1a of the first part 12a, and the reference length L1b of the second part 12b, of the first external electrode 12, as well as the reference length L2a of the first part 13a, and the reference length L2b of the second part 13b, of the second external electrode 13, all have the below-mentioned dimensional tolerances in reality. Accordingly, setting the aforementioned reference spacings smaller increases the chances of the first parts 12a and 13a shorting with each other due to plus side cumulative dimensional tolerances.

According to the manufacturing techniques currently available, the aforementioned shorting can be avoided without hindrance, so long as the aforementioned reference spacings are set to 100 μm or more. In other words, preferably the reference length L1a of the first part 12a of the first external electrode 12, and the reference length L2a of the first part 13a of the second external electrode 13, which respectively represent the larger reference lengths of the first external electrode 12 and the second external electrode 13, are set in a manner satisfying the relational expression "(L1a+L2a)≤(L−100 μm)," regardless of the size of the reference length L of the multilayer ceramic capacitor 20.

It should be noted that the sum of the upper limit of the reference length L1a of the first part 12a of the first external electrode 12 and the upper limit of the reference length L2a of the first part 13a of the second external electrode 13 can be derived by assigning the value of L to the aforementioned relational expression "(L1a+L2a)≤(L−100 μm)."

<The Dimensional Relationship Between the Reference Length L1a of the First Part 12a, and the Reference Length L1b of the Second Part 12b, of the First External Electrode 12 (L1a>L1b), and the Dimensional Relationship Between the Reference Length L2a of the First Part 13a, and the Reference Length L2b of the Second Part 13b, of the Second External Electrode 13 (L2A<L2b)>

When the multilayer ceramic capacitor 20 is placed on the surface of, or embedded in, a circuit board (not illustrated) using a mounter (not illustrated), an external force is applied to the multilayer ceramic capacitor 20 from the mounter. Also, when the multilayer ceramic capacitor 20 is connected to a circuit board (not illustrated), an external force is applied to the multilayer ceramic capacitor 20 from the circuit board based on thermal expansion and contraction, etc., of the circuit board. As these external forces are applied to the multilayer ceramic capacitor 20, the multilayer ceramic capacitor 20 warps, primarily in the height direction, and internal forces generate in the multilayer ceramic capacitor 20 in association with this warping.

The first external electrode 12 has a shape having the first part 12a and the second part 12b, while the second external electrode 13 has a shape having the first part 13a and the second part 13b, and accordingly the aforementioned internal forces concentrate in:

A location (referred to as "SP21") near the other length-direction end (right end in FIGS. 11 and 12) of the first part 12a of the first external electrode 12 on one height-direction face (bottom face in FIGS. 11 and 12) of the capacitor body 11;

A location (referred to as "SP22") near one length-direction end (left end in FIGS. 11 and 12) of the first part 13a of the second external electrode 13 on one height-direction face (bottom face in FIGS. 11 and 12) of the capacitor body 11;

A location (referred to as "SP23") near the other length-direction end (right end in FIGS. 11 and 12) of the second part 12b of the first external electrode 12 on the other height-direction face (top face in FIGS. 11 and 12) of the capacitor body 11; and A location (referred to as "SP24") near one length-direction end (left end in FIGS. 11 and 12) of the second part 13b of the second external electrode 13 on the other height-direction face (top face in FIGS. 11 and 12) of the capacitor body 11.

This means that, if the reference length L1a of the first part 12a, and the reference length L1b of the second part 12b, of the first external electrode 12 are set to the same value, the chances are higher that the internal force concentration locations SP21 and SP23 line up on a straight line along the height direction of the capacitor body 11, and therefore these locations become susceptible to cracking. Similarly, if the reference length L2a of the first part 13a, and the reference length L2b of the second part 13b, of the second external electrode 13 are set to the same value, the chances are higher that the internal force concentration locations SP22 and SP24 line up on a straight line along the height direction of the capacitor body 11, and therefore these locations become susceptible to cracking.

On the other hand, if the reference length L1a of the first part 12a, and the reference length L1b of the second part 12b, of the first external electrode 12 satisfy the aforementioned relational expression "L1a>L1b," the chances are lower that the internal force concentration locations SP21 and SP23 line up on a straight line along the height direction of the capacitor body 11, and therefore these locations are no longer susceptible to cracking. Similarly, if the reference length L2a of the first part 13a, and the reference length L2b of the second part 13b, of the second external electrode 13 satisfy the aforementioned relational expression "L2a>L2b," the chances are lower that the internal force concentration locations SP22 and SP24 line up on a straight line along the height direction of the capacitor body 11, and therefore these locations are no longer susceptible to cracking.

It should be noted that, even when the reference length L1a of the first part 12a, and the reference length L1b of the second part 12b, of the first external electrode 12 satisfy the aforementioned relational expression "L1a>L1b," and the reference length L2a of the first part 13a, and the reference length L2b of the second part 13b, of the second external electrode 13 also satisfy the aforementioned relational expression "L2a>L2b," the actual dimensions of the reference lengths L1a, L1b, L2a, and L2b may satisfy the relationships "Actual dimension of L1a<Actual dimension of L1b" and "Actual dimension of L2a<Actual dimension of L2b," especially if the dimensional difference between the reference lengths L1a and L1b, and the dimensional difference between the reference lengths L2a and L2b, are small, because of the impact of the actual dimensional tolerance (a maximum of ±5% based on the manufacturing technology currently available) on the reference lengths L1a, L1b, L2a and L2b.

The above is explained using an example below. By setting the smaller reference lengths L1b and L2b of the first external electrode 12 and the second external electrode 13 to 100 μm, respectively, and the larger reference lengths L1a and L2a to 110 μm, respectively, the actual dimension of the smaller reference lengths L1b and L2b may become 105 μm (100 μm+5 μm) and the actual dimension of the larger reference lengths L1a and L2a may become 104.5 μm (110 μm-5.5 μm), which is smaller than 105 μm, when the aforementioned dimensional tolerance is taken into account.

To avoid such impact of dimensional tolerance, preferably the larger reference length L1a is set to 1.12 or more times the smaller reference length L1b, and preferably the larger reference length L2a is set to 1.12 or more times the smaller reference length L2b. This way, "Actual dimension of L1a>Actual dimension of L1b" and "Actual dimension of L2a>Actual dimension of L2b" can be achieved even when the dimensional difference between the reference lengths L1a and L1b, and the dimensional difference between the reference lengths L2a and L2b, are small.

Next, an example of how the multilayer ceramic capacitor 20 is manufactured, or specifically an example of how it is manufactured when the primary component of the capacitor body 11 excluding the internal electrode layers 11a1 is barium titanate, the primary component of each internal electrode layer 11a1, primary component of each first base conductor film 12c1 or 13c1, primary component of each second base conductor film 12c2 or 13c2, and primary component of each third base conductor film 12c3 or 13c3, are all nickel, and the primary component of each surface conductor film 12d or 13d is tin, is explained using FIGS. 13A to 16 and also by quoting the symbols shown in FIGS. 10 to 12. It should be noted that the manufacturing method explained here is only an example and does not limit in any way how the multilayer ceramic capacitor 20 is manufactured.

For the manufacturing, a ceramic slurry containing barium titanate powder, organic solvent, organic binder, dispersant, etc., as well as an electrode paste containing nickel powder, organic solvent, organic binder, dispersant, etc., are prepared.

Figure 13A:
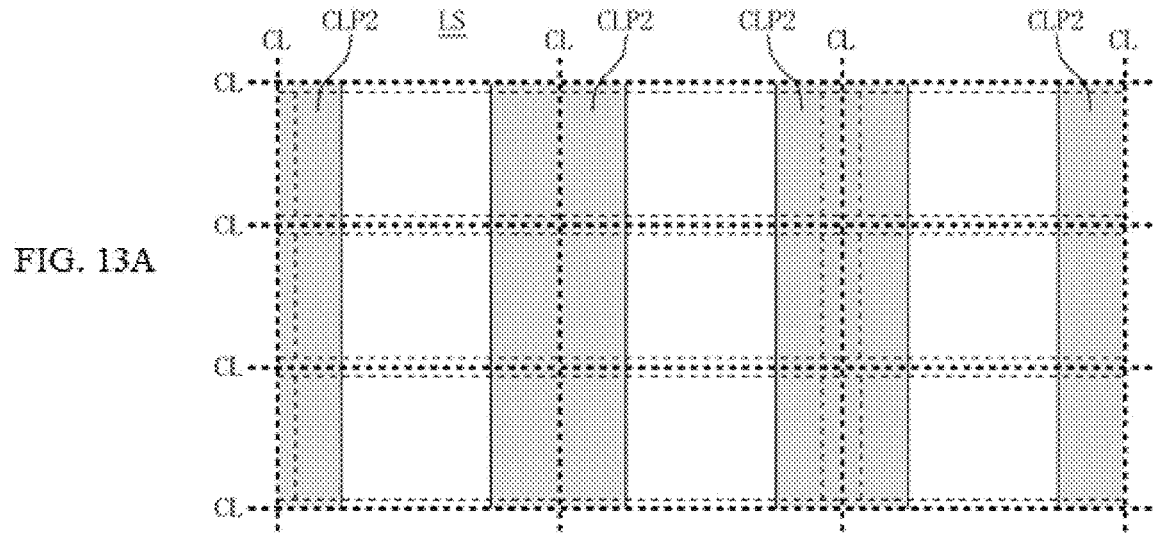
FIGS. 13A and 13B are drawings explaining an example of how the multilayer ceramic capacitor shown in FIGS. 10 to 12 is manufactured.
Figure 13B:
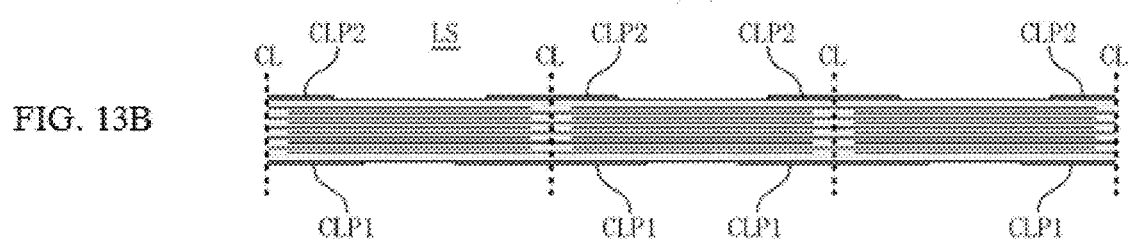

Next, the ceramic slurry is coated on the surface of a carrier film and then dried, to produce a first sheet having a green sheet formed on the carrier film. Also, the electrode paste is printed on the surface of the green sheet of the first sheet and then dried, to form a second sheet having unsintered matrix or zigzag internal electrode layer patterns formed on the surface of the green sheet of the first sheet. These unsintered internal electrode layer patterns are constituted by unsintered internal electrode layer patterns (not accompanied by symbol), each having a reference length of approx. twice that of the internal electrode layer 11a1, as shown in FIGS. 13A and 13B. Furthermore, the electrode paste is printed on the surface of the green sheet of the first sheet and then dried, to produce a third sheet having unsintered striped base conductor film patterns on the surface of the green sheet of the first sheet; also, the electrode paste is printed on the surface of the green sheet of the first sheet and then dried, to produce a fourth sheet having unsintered striped base conductor film patterns on the surface of the green sheet of the first sheet. As shown in FIGS. 13A and 13B, the unsintered base conductor film patterns formed on one of the third sheet and the fourth sheet are constituted by base conductor film patterns CLP1 having the larger length (lateral-direction dimension in FIGS. 13A and 13B); the unsintered base conductor film patterns formed on the other of the third sheet and the fourth sheet are constituted by base conductor film patterns CLP2 having the smaller length (lateral-direction dimension in FIGS. 13A and 13B). The unsintered base conductor film patterns CLP1 of the larger length (lateral-direction dimension in FIGS. 13A and 13B) have a reference length of approx. twice that of the first base conductor film 12c1 or 13c1, while the unsintered base conductor film patterns CLP2 of the smaller length (lateral-direction dimension in FIGS. 13A and 13B) have a reference length of approx. twice that of the second base conductor film 12c2 or 13c2.

Next, a specified number of unit sheets taken from the green sheet of the first sheet are stacked and thermally compressed together, one by one, to form an area corresponding to one dielectric margin part 11b in the height direction. Then, a specified number of unit sheets (including the unsintered internal electrode layer patterns) taken from the green sheet of the second sheet are stacked and thermally compressed together, one by one, to form an area corresponding to the capacitive part 11a. Then, a specified number of unit sheets taken from the green sheet of the first sheet are stacked and thermally compressed together, one by one, to form an area corresponding to the other dielectric margin part 11b in the height direction. Then, unit sheets (including the unsintered base conductor film patterns) taken from the green sheet of one of the third sheet and the fourth sheet are stacked on one height-direction face of the above and thermally compressed together, while unit sheets (including the unsintered base conductor film patterns) taken from the green sheet of the other of the third sheet and the fourth sheet are stacked on the other height-direction face of the above and thermally compressed together. Finally, the entire sheets are thermally compressed for one last time, to produce an unsintered multilayer sheet LS (refer to FIGS. 13A and 13B).

Figure 14:
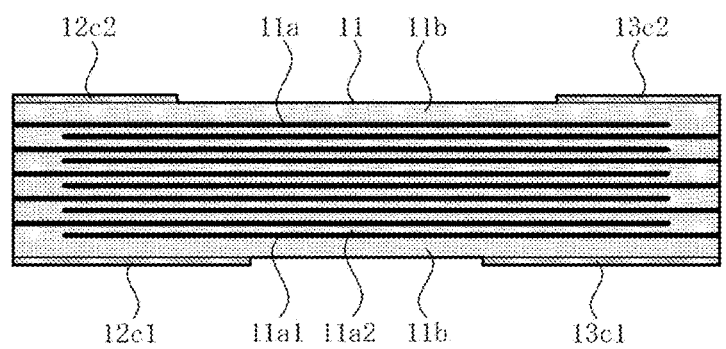
FIG. 14 is a drawing explaining an example of how the multilayer ceramic capacitor shown in FIGS. 10 to 12 is manufactured.

Next, the unsintered multilayer sheet is cut into a grid along cutting lines CL (refer to FIGS. 13A and 13B), to produce unsintered capacitor bodies, each corresponding to the capacitor body 11 (refer to FIG. 14). Provided on one height-direction face (bottom face in FIG. 14) of each such unsintered capacitor body is an unsintered first base conductor film corresponding to each first base conductor film 12c1 or 13c1, while provided on the other height-direction face (top face in FIG. 14) of the unsintered capacitor body is an unsintered second base conductor film corresponding to each second base conductor film 12c2 or 13c2.

Next, the electrode paste is applied by means of dip-coating, coating, or printing, and then dried, to form an unsintered third base conductor film corresponding to each third base conductor film 12c3 or 13c3, on both length-direction faces of the unsintered capacitor body (refer to FIG. 15).

Next, the many unsintered capacitor bodies having the unsintered first base conductor films, second base conductor films, and third base conductor films, are put in a sintering oven and sintered (including binder removal and sintering) all at once in a reducing ambience based on a temperature profile appropriate for barium titanate and nickel, to produce capacitor bodies 11, each having each of the first base conductor films 12c1 and 13c1, each of the second base conductor films 12c2 and 13c2, and each of the third base conductor films 12c3 and 13c3 (refer to FIG. 15).

Next, the wet plating method or dry plating method is used to form a surface conductor film 12d covering the entire surfaces of the first base conductor film 12c1, second base conductor film 12c2, and third base conductor film 12c3, and also form a surface conductor film 13d covering the entire surfaces of the first base conductor film 13c1, second base conductor film 13c2, and third base conductor film 13c3 (refer to FIG. 16). This completes the manufacturing of the multilayer ceramic capacitor 20.

It should be noted that the unsintered capacitor body shown in FIG. 14 may be sintered to produce a capacitor body 11 first, and then each of the third base conductor films 12c3 and 13c3 may be formed on both length-direction faces of this capacitor body 11.

Next, the effects achieved by the multilayer ceramic capacitor 20 are explained.

(E21) The multilayer ceramic capacitor 20 comprises a first external electrode 12 having a first part 12a that wraps around onto one height-direction face of the capacitor body 11 and a second part 12b that wraps around onto the other height-direction face of the capacitor body 11, as well as a second external electrode 13 having a first part 13a that wraps around onto one height-direction face of the capacitor body 11 and a second part 13b that wraps around onto the other height-direction face of the capacitor body 11. Also, the reference length L1a of the first part 12a, and the reference length L1b of the second part 12b, of the first external electrode 12, satisfy the relational expression "L1a>L1b," while the reference length L2a of the first part 13a, and the reference length L2b of the second part 13b, of the second external electrode 13, satisfy the relational expression "L2a>L2b."

This means that, even when the multilayer ceramic capacitor 20 warps due to the external forces described above and internal forces generate in the multilayer ceramic capacitor 20 due to this warping, the chances are lower that the internal force concentration locations SP21 and SP23 line up on a straight line along the height direction of the capacitor body 11, and therefore these locations are no longer susceptible to cracking. Similarly, the chances are lower that the internal force concentration locations SP22 and SP24 line up on a straight line along the height direction of the capacitor body 11, and therefore these locations are no longer susceptible to cracking.

(E22) With the multilayer ceramic capacitor 20, the reference length L1a of the first part 12a of the first external electrode 12 is the same as the reference length L2a of the first part 13a of the second external electrode 13, while the reference length L1b of the second part 12b of the first external electrode 12 is the same as the reference length L2b of the second part 13b of the second external electrode 13.

In other words, the mode of the first part 12a of the first external electrode 12 and that of the first part 13a of the second external electrode 13 on one height-direction face of the multilayer ceramic capacitor 20, are different from the mode of the second part 12b of the first external electrode 12 and that of the second part 13b of the second external electrode 13 on the other height-direction face of the multilayer ceramic capacitor 20 on the reference length level. Accordingly, the height-direction orientation of the multilayer ceramic capacitor 20 can be arbitrarily selected in accordance with the connection method (solder connection, via connection (plating connection), etc.)

(E23) With the multilayer ceramic capacitor 20 (reference length L), the reference length L1a of the first part 12a of the first external electrode 12 and the reference length L2a of the first part 13a of the second external electrode 13, which respectively represent the larger reference lengths of the first external electrode 12 and the second external electrode 13, satisfy the relational expression "(L1a+L2a)≤(L−100 μm)."

This means that, when the multilayer ceramic capacitor 20 is placed on the surface of, or embedded in, a circuit board (not illustrated) and connected to wiring, the aforementioned shorting of the first part 12a of the first external electrode 12 and the first part 13a of the second external electrode 13, which may be caused by scattering of bonding material or by dimensional tolerance as mentioned above, can be avoided without fail.

(E24) With the multilayer ceramic capacitor 20, the reference length L1a of the first part 12a is set to 1.12 or more times the reference length L1b of the second part 12b, with respect to the first external electrode 12, while the reference length L2a of the first part 13a is set to 1.12 or more times the reference length L2b of the second part 13b, with respect to the second external electrode 13.

This means that, even when the dimensional difference between the reference length L1a of the first part 12a, and the reference length L1$b$ of the second part 12$b$, of the first external electrode 12, is small, and so is the dimensional difference between the reference length L2$a$ of the first part 13$a$, and the reference length L2$b$ of the second part 13$b$, of the second external electrode 13, the aforementioned relationship of "Actual dimension of L1$a$<Actual dimension of L1$b$" or "Actual dimension of L2$a$<Actual dimension of L2$b$," which may result from the impact of dimensional tolerance as mentioned above, can be avoided without fail.

Next, the results of verifying the effect E21 (suppression of cracking) are explained using FIGS. 17 and 18 and also by quoting the symbols used in FIGS. 10 to 12.

For the verification, 100 units each of Prototypes P1 and P28 to P41 (refer to FIG. 18), all corresponding to the multilayer ceramic capacitor 20 shown in FIGS. 10 to 12, were produced according to the aforementioned example of manufacturing method. It should be noted that, in FIG. 18, Prototype P1 is a control (reference or comparative example) which is the same as Prototype P1 shown in FIG. 9. With Prototypes P1 and P28 to P41, the reference length L, reference width W, and reference height H are 1000 μm, 500 μm, and 250 μm, respectively, and their capacitor bodies 11 all have the same structure. Also, with Prototypes P1 and P28 to P41, the reference length L1$b$ of the second part 12$b$ of the first external electrode 12, and the reference length L2$b$ of the second part 13$b$ of the second external electrode 13, are all 250 μm (refer to FIG. 18). Furthermore, Prototype P1 is such that the reference length L1$a$ of the first part 12$a$ of the first external electrode 12 and the reference length L2$a$ of the first part 13$a$ of the second external electrode 13 are set to 250 μm, while Prototypes P28 to P41 are such that the reference length L1$a$ of the first part 12$a$ of the first external electrode 12 and the reference length L2$a$ of the first part 13$a$ of the second external electrode 13 are set incrementally larger than 250 μm in a range of 260 to 490 μm (refer to FIG. 18).

As for the verification method, as shown in FIG. 17, first the 100 units of Prototype P1 were each supported with two support members SM on one height-direction face, and in this condition, the center of the other height-direction face (refer to CE in FIG. 10) was pressed with a pressing member PM and the average of pressing forces that caused cracking (base pressing force) was calculated. Then, a similar pressing test was conducted on 100 units each of Prototypes P28 to P41, and the number of units that cracked under the base pressing force was counted. In the "Strength test result" column in FIG. 18, the fields of Prototypes P28 to P41 each show this count in the format of n/100. It should be noted that Prototype P1 is the control for calculating the base pressing force, so the field of Prototype P1 in the "Strength test result" column in FIG. 18 shows "- - - ."

As is evident from the strength test results in FIG. 18, cracking was sufficiently suppressed in Prototypes P28 to P41 satisfying the relational expression "L1$a$>L1$b$" as well as the relational expression "L2$a$>L2$b$."

Among Prototypes P28 to P41, a small number of cracks generated in Prototypes P28 and P29; however, this probably has to do with the impact of dimensional tolerance as mentioned above. Also, although no cracks were found in Prototypes P30 to P41, it would be difficult to avoid the aforementioned shorting in Prototypes P40 and P41 where the reference spacing between the first part 12$a$ of the first external electrode 12 and the first part 13$a$ of the second external electrode 13 is all less than 100 μm. In other words, among Prototypes P28 to P41 satisfying the relational expression "L1$a$>L1$b$" and the relational expression "L2$a$>L2$b$," Prototypes P30 to P39 are more practical.

It should be noted that, although the reference length L1$b$ of the second part 12$b$ of the first external electrode 12, and the reference length L2$b$ of the second part 13$b$ of the second external electrode 13, were both set to 250 μm for all of Prototypes P28 to P41 in the aforementioned verification, it has been confirmed that an effect similar to the one mentioned above (suppression of cracking) could be achieved even when these reference lengths L1$b$ and L2$b$ are both set to a value other than 250 μm, or specifically 100 μm, 150 μm, 200 μm, 300 μm, or 350 μm, so long as the relational expression "L1$a$>L1$b$" and the relational expression "L2$a$>L2$b$" are both satisfied.

Third Embodiment

Figure 19A:
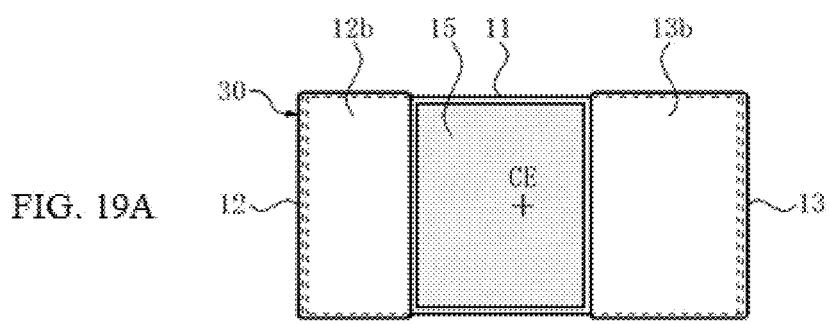
Figure 19B:
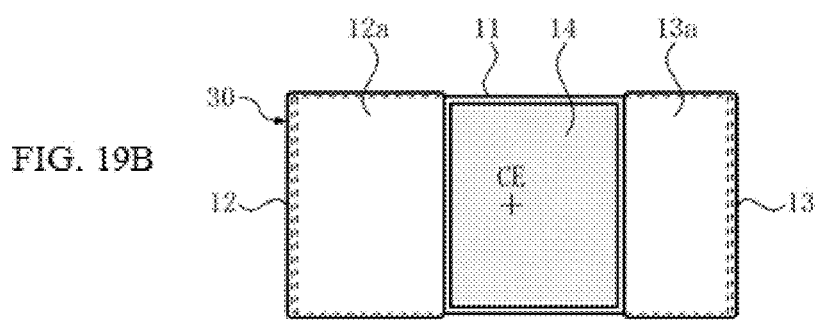
FIG. 19B is a bottom view of the same multilayer ceramic capacitor.

FIGS. 19A and 19B show a multilayer ceramic capacitor 30 pertaining to the third embodiment of the present invention. This multilayer ceramic capacitor 30 is structurally different from the multilayer ceramic capacitor 10 pertaining to the first embodiment in that a first insulator film 14 is provided in the area between the first part 12$a$ of the first external electrode 12 and the first part 13$a$ of the second external electrode 13 on one height-direction face of the capacitor body 11 (refer to FIG. 19B), and that a second insulator film 15 is provided in the area between the second part 12$b$ of the first external electrode 12 and the second part 13$b$ of the second external electrode 13 on the other height-direction face of the capacitor body 11 (refer to FIG. 19A). The remainder of the structure is the same as that of the multilayer ceramic capacitor 10 pertaining to the first embodiment, and therefore is denoted using the same symbols and not explained.

The first insulator film 14 shown in FIG. 19B has an outline of roughly rectangular shape. The reference width (not accompanied by symbol) of the first insulator film 14 may be slightly smaller than the reference width (not accompanied by symbol) of the capacitor body 11, or it may be the same as this reference width (not accompanied by symbol). The reference length (not accompanied by symbol) of the first insulator film 14 may be slightly smaller than the reference spacing (not accompanied by symbol) between the first part 12$a$ of the first external electrode 12 and the first part 13$a$ of the second external electrode 13, or it may be the same as this reference spacing. The reference thickness (not accompanied by symbol) of the first insulator film 14 may be the same as the reference thickness (not accompanied by symbol) of the first part 12$a$ of the first external electrode 12 or the reference thickness (not accompanied by symbol) of the first part 13$a$ of the second external electrode 13, or it may be slightly smaller than either of these reference thicknesses.

The second insulator film 15 shown in FIG. 19A has an outline of roughly rectangular shape. The reference width (not accompanied by symbol) of the second insulator film 15 may be slightly smaller than the reference width (not accompanied by symbol) of the capacitor body 11, or it may be the same as this reference width (not accompanied by symbol). The reference length (not accompanied by symbol) of the second insulator film 15 may be slightly smaller than the reference spacing (not accompanied by symbol) between the second part 12$b$ of the first external electrode 12 and the second part 13$b$ of the second external electrode 13, or it may be the same as this reference spacing. The reference thickness (not accompanied by symbol) of the second insulator film 15 may be the same as the reference thickness (not accompanied by symbol) of the second part 12$b$ of the first external electrode 12 or the reference thickness (not accompanied by symbol) of the second part 13b of the second external electrode 13, or it may be slightly smaller than either of these reference thicknesses.

For the primary component of each insulator film 14 or 15, any of the dielectric materials (dielectric ceramic materials) described in <<First Embodiment>> above, or any synthetic resin material, glass material, metal oxide material, or other insulating material may be used. To produce each of the insulator films 14 and 15 whose primary component is a dielectric material, preferably a method is adopted whereby, in the example of manufacturing method described in <<First Embodiment>> above, a dielectric slurry is printed on one height-direction face and the other height-direction face of an unsintered capacitor body (refer to FIG. 5), and then dried, to form unsintered dielectric films corresponding to each of the insulator films 14 and 15, after which these unsintered dielectric films are sintered together with the unsintered base conductor films, to produce each of the insulator films 14 and 15. A method similar to the foregoing may be adopted when producing each of the insulator films 14 and 15 whose primary component is a glass material or metal oxide. Also, to produce each of the insulator films 14 and 15 whose primary component is a synthetic resin material, preferably a method is adopted whereby, in the example of manufacturing method described in <<First Embodiment>> above, synthetic resin sheets are attached on one height-direction face and the other height-direction face of a sintered capacitor body 11 (refer to FIG. 6), or a synthetic resin paste is sprayed thereon and then cured, to produce each of the insulator films 14 and 15.

The each of the insulator films 14 and 15 of the multilayer ceramic capacitor 30 serves to make one height-direction face or the other height-direction face of the multilayer ceramic capacitor 30 as flat as possible by filling, respectively, the concave part that manifests on one height-direction face of the multilayer ceramic capacitor 30 based on the thickness of the first part 12a of the first external electrode 12 and the thickness of the first part 13a of the second external electrode 13, or the concave part that manifests on the other height-direction face of the multilayer ceramic capacitor 30 based on the thickness of the second part 12b of the first external electrode 12 and the thickness of the second part 13b of the second external electrode 13. In addition, each of the insulator films 14 and 15 contributes to the suppression of cracking by supplementing the strength of a capacitor body 11 which has a small height. Other effects achieved by the multilayer ceramic capacitor 30 are the same as those described in <<First Embodiment>> and are thus not explained.

It should be noted that, while an insulator film 14 is provided on one height-direction face, and another insulator film 15 is provided on the other height-direction face, of the capacitor body 11 in FIGS. 19A and 19B, an insulator film 14 or 15 may be provided only on one height-direction face or the other height-direction face of the capacitor body 11.

Fourth Embodiment

Figure 20A:
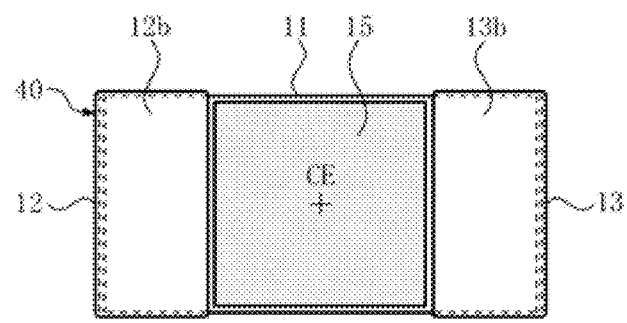
Figure 20B:
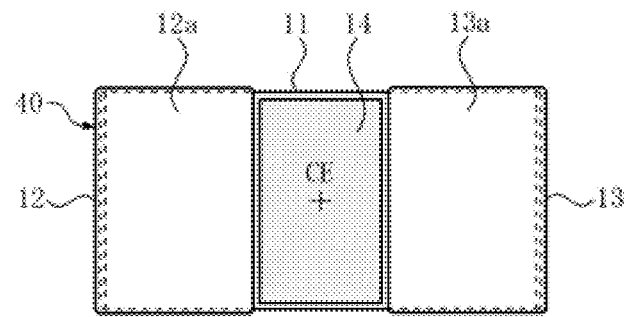
FIG. 20B is a bottom view of the same multilayer ceramic capacitor.

FIGS. 20A and 20B show a multilayer ceramic capacitor 40 pertaining to the fourth embodiment of the present invention. This multilayer ceramic capacitor 40 is structurally different from the multilayer ceramic capacitor 20 pertaining to the second embodiment in that a first insulator film 14 is provided in the area between the first part 12a of the first external electrode 12 and the first part 13a of the second external electrode 13 on one height-direction face of the capacitor body 11 (refer to FIG. 20B), and that a second insulator film 15 is provided in the area between the second part 12b of the first external electrode 12 and the second part 13b of the second external electrode 13 on the other height-direction face of the capacitor body 11 (refer to FIG. 20A). The remainder of the structure is the same as that of the multilayer ceramic capacitor 20 pertaining to the second embodiment, and therefore is denoted using the same symbols and not explained.

The first insulator film 14 shown in FIG. 20B has an outline of roughly rectangular shape. The reference width (not accompanied by symbol) of the first insulator film 14 may be slightly smaller than the reference width (not accompanied by symbol) of the capacitor body 11, or it may be the same as this reference width (not accompanied by symbol). The reference length (not accompanied by symbol) of the first insulator film 14 may be slightly smaller than the reference spacing (not accompanied by symbol) between the first part 12a of the first external electrode 12 and the first part 13a of the second external electrode 13, or it may be the same as this reference spacing. The reference thickness (not accompanied by symbol) of the first insulator film 14 may be the same as the reference thickness (not accompanied by symbol) of the first part 12a of the first external electrode 12 or the reference thickness (not accompanied by symbol) of the first part 13a of the second external electrode 13, or it may be slightly smaller than either of these reference thicknesses.

The second insulator film 15 shown in FIG. 20A has an outline of roughly rectangular shape. The reference width (not accompanied by symbol) of the second insulator film 15 may be slightly smaller than the reference width (not accompanied by symbol) of the capacitor body 11, or it may be the same as this reference width (not accompanied by symbol). The reference length (not accompanied by symbol) of the second insulator film 15 may be slightly smaller than the reference spacing (not accompanied by symbol) between the second part 12b of the first external electrode 12 and the second part 13b of the second external electrode 13, or it may be the same as this reference spacing. The reference thickness (not accompanied by symbol) of the second insulator film 15 may be the same as the reference thickness (not accompanied by symbol) of the second part 12b of the first external electrode 12 or the reference thickness (not accompanied by symbol) of the second part 13b of the second external electrode 13, or it may be slightly smaller than either of these reference thicknesses.

For the primary component of each insulator film 14 or 15, any of the dielectric materials (dielectric ceramic materials) described in <<First Embodiment>> above, or any synthetic resin material, glass material, metal oxide material, or other insulating material may be used. To produce each of the insulator films 14 and 15 whose primary component is a dielectric material, preferably a method is adopted whereby, in the example of manufacturing method described in <<Second Embodiment>> above, a dielectric slurry is printed on one height-direction face and the other height-direction face of an unsintered capacitor body (refer to FIG. 14), and then dried, to form unsintered dielectric films corresponding to each of the insulator films 14 and 15, after which these unsintered dielectric films are sintered together with the unsintered base conductor films, to produce each of the insulator films 14 and 15. A method similar to the foregoing may be adopted when producing each of the insulator films 14 and 15 whose primary component is a glass material or metal oxide. Also, to produce each of the insulator films 14 and 15 whose primary component is a synthetic resin material, preferably a method is adopted whereby, in the example of manufacturing method described in <<Second Embodiment>> above, synthetic resin sheets are attached on one height-direction face and the other height-direction face of a sintered capacitor body 11 (refer to FIG. 15), or a synthetic resin paste is sprayed thereon and then cured, to produce each of the insulator films 14 and 15.

The each of the insulator films 14 and 15 of the multilayer ceramic capacitor 40 serves to make one height-direction face or the other height-direction face of the multilayer ceramic capacitor 40 as flat as possible by filling, respectively, the concave part that manifests on one height-direction face of the multilayer ceramic capacitor 40 based on the thickness of the first part 12a of the first external electrode 12 and the thickness of the first part 13a of the second external electrode 13, or the concave part that manifests on the other height-direction face of the multilayer ceramic capacitor 40 based on the thickness of the second part 12b of the first external electrode 12 and the thickness of the second part 13b of the second external electrode 13. In addition, each of the insulator films 14 and 15 contributes to the suppression of cracking by supplementing the strength of a capacitor body 11 which has a small height. Other effects achieved by the multilayer ceramic capacitor 40 are the same as those described in <<Second Embodiment>> and are thus not explained.

It should be noted that, while an insulator film 14 is provided on one height-direction face, and another insulator film 15 is provided on the other height-direction face, of the capacitor body 11 in FIG. 20, an insulator film 14 or 15 may be provided only on one height-direction face or the other height-direction face of the capacitor body 11.

Other Embodiments (M1) In the first embodiment through the fourth embodiment, multilayer ceramic capacitors 10 to 40 based on prototypes whose reference length L is 1000 μm, reference width W is 500 μm, and reference height H is 250 μm, were illustrated; however, even with multilayer ceramic capacitors whose reference length L, reference width W, and reference height H are different from these values, the present invention can still be applied to achieve similar objects.

(M2) In the first embodiment through the fourth embodiment, multilayer ceramic capacitors 10 to 40 whose reference length L, reference width W, and reference height H have the relationship "L>W>H," were illustrated; however, even with multilayer ceramic capacitors whose reference length L, reference width W, and reference height H have the relationship "L>W=H," "L>H>W," "W>L>H," "W>L=H," or "W>H>L," for example, the present invention can still be applied to achieve similar objects.

(M3) In the first embodiment through the fourth embodiment, a first external electrode 12 having a first base conductor film 12c1, a second base conductor film 12c2, a third base conductor film 12c3, and a surface conductor film 12d, as well as a second external electrode 13 having a first base conductor film 13c1, a second base conductor film 13c2, a third base conductor film 13c3, and a surface conductor film 13d, were illustrated; however, even with multilayer ceramic capacitors whose external electrodes have no surface conductor film 12d or 13d, the present invention can still be applied to achieve similar objects.

In the present disclosure where conditions and/or structures are not specified, a skilled artisan in the art can readily provide such conditions and/or structures, in view of the present disclosure, as a matter of routine experimentation.

Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-203369, filed Oct. 17, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:
1. A multilayer ceramic capacitor, comprising:
a capacitor body of roughly rectangular solid shape which has a capacitive part constituted by multiple internal electrode layers stacked together with dielectric layers in between;
a first external electrode which is provided on one length-direction face of the capacitor body and which is connected to some of the multiple internal electrode layers; and
a second external electrode which is provided on another length-direction face of the capacitor body and which is connected to a remainder of the multiple internal electrode layers;
wherein the first external electrode has a first part provided on one height-direction face of the capacitor body and a second part provided on another height-direction face of the capacitor body, the second external electrode has a first part provided on the one height-direction face of the capacitor body and a second part provided on the other height-direction face of the capacitor body, and the first and second external electrodes have substantially no parts provided on either of width-direction faces of the capacitor body;
wherein, when a reference length of an outermost layer of the first part of the first external electrode is given by L1a, a reference length of an outermost layer of the second part of the first external electrode is given by L1b, a reference length of an outermost layer of the first part of the second external electrode is given by L2a, and a reference length of an outermost layer of the second part of the second external electrode is given by L2b, then the reference length L1a is set to a value different from that of the reference length L1b, and the reference length L2a is set to a value different from that of the reference length L2b, wherein each of the reference lengths L1a, L1b, L2a, and L2b is a maximum length on the corresponding height-direction face of the capacitor body;

wherein the reference length L1a and the reference length L1b satisfy a relational expression "L1a>L1b," and the reference length L2a and the reference length L2b satisfy a relational expression "L2a<L2b"; and wherein the first external electrode and the second external electrode do not positionally overlap each other as viewed in the height direction.

2. The multilayer ceramic capacitor according to claim 1, wherein the reference length L1a is same as the reference length L2b, and the reference length L1b is same as the reference length L2a.

3. The multilayer ceramic capacitor according to claim 1, wherein, when a reference length of the multilayer ceramic capacitor is given by L, then the reference length L1a and the reference length L2a satisfy a relational expression "(L1a+L2a)≤(L−100 µm)," and the reference length L1b and the reference length L2b satisfy a relational expression "(L1b+L2b)≤(L−100 µm)."

4. The multilayer ceramic capacitor according to claim 1, wherein the reference length L1a is set to 1.12 or more times the reference length L1b, and the reference length L2b is set to 1.12 or more times the reference length L2a.

5. The multilayer ceramic capacitor according to claim 1, wherein an insulator film is provided in at least one of an area between the first part of the first external electrode and the first part of the second external electrode on the one height-direction face of the capacitor body and an area between the second part of the first external electrode and the second part of the second external electrode on the other height-direction face of the capacitor body.

6. The multilayer ceramic capacitor according to claim 5, wherein the insulator film is a dielectric film.

7. A multilayer ceramic capacitor, comprising:
a capacitor body of roughly rectangular solid shape which has a capacitive part constituted by multiple internal electrode layers stacked together with dielectric layers in between;
a first external electrode which is provided on one length-direction face of the capacitor body and which is connected to some of the multiple internal electrode layers; and
a second external electrode which is provided on another length-direction face of the capacitor body and which is connected to a remainder of the multiple internal electrode layers,
wherein the first external electrode has a first part provided on one height-direction face of the capacitor body and a second part provided on another height-direction face of the capacitor body, the second external electrode has a first part provided on the one height-direction face of the capacitor body and a second part provided on the other height-direction face of the capacitor body, and the first and second external electrodes have substantially no parts provided on either of width-direction faces of the capacitor body;

wherein, when a reference length of an outermost layer of the first part of the first external electrode is given by L1a, a reference length of an outermost layer of the second part of the first external electrode is given by L1b, a reference length of an outermost layer of the first part of the second external electrode is given by L2a, and a reference length of an outermost layer of the second part of the second external electrode is given by L2b, then the reference length L1a is set to a value different from that of the reference length L1b, and the reference length L2a is set to a value different from that of the reference length L2b, wherein each of the reference lengths L1a, L1b, L2a, and L2b is a maximum length on the corresponding height-direction face of the capacitor body;

wherein the reference length L1a and the reference length L1b satisfy a relational expression "L1a>L1b," and the reference length L2a and the reference length L2b satisfy a relational expression "L2a>L2b", wherein the reference length L1a is set to 1.12 or more times the reference length L1b, and the reference length L2a is set to 1.12 or more times the reference length L2b; and wherein the first external electrode and the second external electrode do not positionally overlap each other as viewed in the height direction.

8. The multilayer ceramic capacitor according to claim 7, wherein the reference length L1a is same as the reference length L2a, and the reference length L1b is same as the reference length L2b.

9. The multilayer ceramic capacitor according to claim 7, wherein, when a reference length of the multilayer ceramic capacitor is given by L, then the reference length L1a and the reference length L2a satisfy a relational expression "(L1a+L2a)≤(L−100 µm)."

10. The multilayer ceramic capacitor according to claim 7, wherein an insulator film is provided in at least one of an area between the first part of the first external electrode and the first part of the second external electrode on the one height-direction face of the capacitor body and an area between the second part of the first external electrode and the second part of the second external electrode on the other height-direction face of the capacitor body.

11. The multilayer ceramic capacitor according to claim 10, wherein the insulator film is a dielectric film.

* * * * *